(12) United States Patent
Iwagaki et al.

(10) Patent No.: US 11,875,817 B2
(45) Date of Patent: Jan. 16, 2024

(54) HARMFUL BEHAVIOR DETECTING SYSTEM AND METHOD THEREOF

(71) Applicant: Hitachi Systems Ltd., Tokyo (JP)

(72) Inventors: Satoshi Iwagaki, Tokyo (JP); Atsushi Shimada, Tokyo (JP); Masumi Suehiro, Tokyo (JP); Hidenori Chiba, Tokyo (JP); Kouichi Horiuchi, Tokyo (JP)

(73) Assignee: Hitachi Systems Ltd., Tokyo (JP)

( * ) Notice: Subject to any disclaimer, the term of this patent is extended or adjusted under 35 U.S.C. 154(b) by 46 days.

(21) Appl. No.: 17/426,500

(22) PCT Filed: Nov. 12, 2019

(86) PCT No.: PCT/JP2019/044428
§ 371 (c)(1),
(2) Date: Jul. 28, 2021

(87) PCT Pub. No.: WO2020/158101
PCT Pub. Date: Aug. 6, 2020

(65) Prior Publication Data
US 2022/0115032 A1  Apr. 14, 2022

(30) Foreign Application Priority Data
Jan. 31, 2019  (JP) ................. 2019-015384

(51) Int. Cl.
*G10L 25/63* (2013.01)
*G10L 15/08* (2006.01)
*G10L 25/72* (2013.01)

(52) U.S. Cl.
CPC .............. *G10L 25/63* (2013.01); *G10L 15/08* (2013.01); *G10L 25/72* (2013.01); *G10L 2015/088* (2013.01)

(58) Field of Classification Search
CPC ......... G10L 25/63; G10L 15/08; G10L 25/72; G10L 2015/088; G10L 17/06; G06Q 10/10; G06Q 50/22; G06F 16/35
See application file for complete search history.

(56) References Cited

U.S. PATENT DOCUMENTS 9,336,268 B1 * 5/2016 Moudy ................... G06F 40/30
10,629,225 B2 * 4/2020 Maekawa ............... G10L 15/04
(Continued)

FOREIGN PATENT DOCUMENTS

| JP | 2008060639 A | 3/2008 |
| JP | 2008165097 A | 7/2008 |

(Continued)

OTHER PUBLICATIONS

World Intellectual Property Organization, International Search Report for International Application No. PCT/JP2019/04428, dated Feb. 4, 2020, 4 total pages.

(Continued)

*Primary Examiner* — Fariba Sirjani
(74) *Attorney, Agent, or Firm* — SoCal IP Law Group LLP; Mark A. Goldstein

(57) ABSTRACT

A technique capable of detecting harmful behavior such as power harassment, sexual harassment, or bullying in work environment to support handling is provided. A harmful behavior detecting system includes a computer that executes observation and detection regarding harmful behavior including power harassment, sexual harassment, and bullying among people in work environment. The computer obtains voice data into which voice around a target person is inputted; obtains voice information containing words and emotion information from the voice data; and obtains data such as vital data, date and time, or a location of the target person. The computer uses five elements including words and an emotion of the other person, words, an emotion, and (Continued)

vital data of the target person to calculate an index value regarding the harmful behavior; estimate a state of the harmful behavior based on the index value; and output handling data for handling the harmful behavior in accordance with the estimated state.

9 Claims, 12 Drawing Sheets

(56) References Cited

U.S. PATENT DOCUMENTS

| | | | | |
|---|---|---|---|---|
| 10,959,657 | B2* | 3/2021 | Kaneko | A61B 5/165 |
| 11,583,190 | B2* | 2/2023 | Shantharam | A61B 5/0022 |
| 2006/0028556 | A1* | 2/2006 | Bunn | H04N 7/181 |
| | | | | 348/E7.086 |
| 2010/0023348 | A1* | 1/2010 | Hardee | G06Q 50/00 |
| | | | | 600/300 |
| 2010/0121707 | A1* | 5/2010 | Goeldi | G06Q 30/0251 |
| | | | | 379/265.09 |
| 2012/0089396 | A1* | 4/2012 | Patel | G10L 25/00 |
| | | | | 704/E15.005 |
| 2016/0330084 | A1* | 11/2016 | Hunter | H04L 47/2425 |
| 2017/0105662 | A1* | 4/2017 | Silawan | A61B 5/14542 |
| 2017/0229004 | A1* | 8/2017 | Shah | G08B 15/02 |
| 2018/0078188 | A1* | 3/2018 | Kaneko | A61B 5/0205 |
| 2018/0184959 | A1* | 7/2018 | Takahashi | A61B 5/1118 |
| 2018/0253954 | A1* | 9/2018 | Verma | G08B 25/08 |
| 2019/0103128 | A1* | 4/2019 | Maekawa | G06F 16/24575 |
| 2020/0020447 | A1* | 1/2020 | Generoso | G16H 50/70 |
| 2020/0090067 | A1* | 3/2020 | Anders | G06F 18/214 |
| 2020/0175970 | A1* | 6/2020 | Li | G10L 15/20 |
| 2020/0329979 | A1* | 10/2020 | Shantharam | A61B 5/681 |
| 2021/0118323 | A1* | 4/2021 | Quy | H04L 67/535 |
| 2021/0193172 | A1* | 6/2021 | Shionozaki | G06V 40/174 |
| 2021/0361948 | A1* | 11/2021 | Leuthardt | A61N 1/36096 |

FOREIGN PATENT DOCUMENTS

| | | |
|---|---|---|
| JP | P2017211586 A | 11/2017 |
| JP | 2017213278 A | 12/2017 |
| JP | 2018045545 A | 3/2018 |
| JP | 2018068618 A | 5/2018 |
| WO | 2020158101 A1 | 8/2020 |

OTHER PUBLICATIONS

Japan Intellectual Property Office, Office Action for Chinese Application No. 2019-015384, dated Jan. 31, 2023, total of 17 pages.

\* cited by examiner

FIG. 7
(A) FIRST PATTERN OF OCCURRENCE OF HARMFUL BEHAVIOR
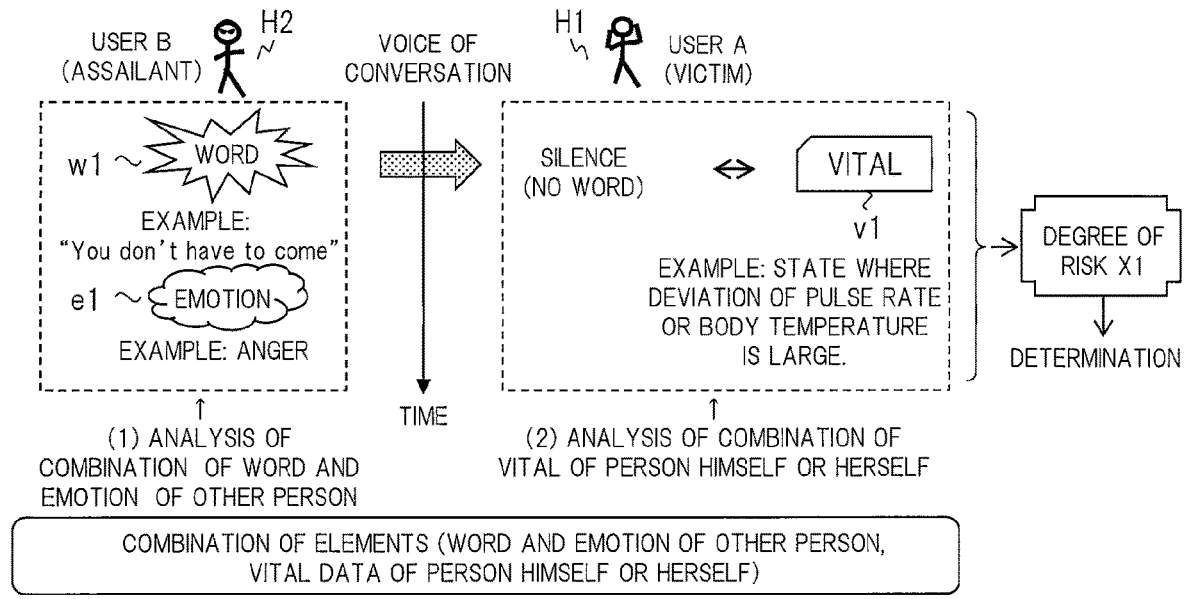
(B) SECOND PATTERN OF OCCURRENCE OF HARMFUL BEHAVIOR
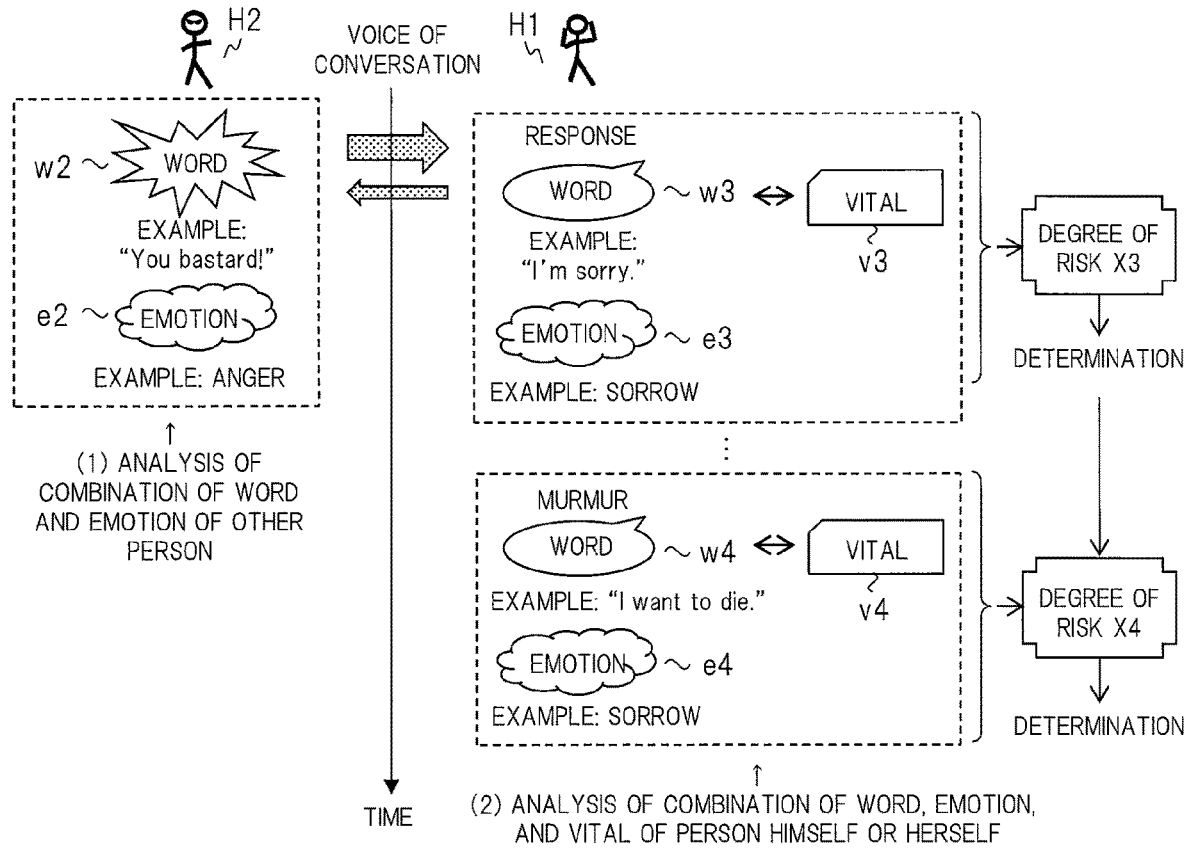

FIG. 8

OBTAINED DATA TABLE

| # | DATE | TIME | LOCATION | WORD | VOICEPRINT OF SPEAKER | EMOTION OF SPEAKER | BODY TEMPERATURE | BODY TEMPERATURE DEVIATION | PULSE RATE | PULSE RATE DEVIATION | ... | INDEX VALUE (DEGREE OF RISK) |
|---|---|---|---|---|---|---|---|---|---|---|---|---|
| 1 | 2018/12/14 | 10:15 | X1, Y1 | You idiot! | B | NORMAL | 36°C | 0 | 66 | 1 | ... | -0.5 |
| 2 | 2018/12/14 | 11:30 | X1, Y1 | You idiot! | C | ANGER | 37°C | 1 | 75 | 10 | ... | -1.95 |
| 3 | 2018/12/14 | 11:45 | X1, Y2 | Bite me! | UNKNOWN | ANGER | 36°C | 0 | 77 | 12 | ... | -1.365 |
| 4 | 2018/12/14 | 13:10 | X1, Y2 | You bastard! | B | DELIGHT | 36°C | 0 | 65 | 0 | ... | -0.1 |
| 5 | 2018/12/14 | 13:50 | X1, Y2 | NON-REGISTERED | D | ANGER | 36.5°C | 0.5 | 70 | 5 | ... | -0.65 |
| ... | ... | ... | ... | ... | ... | ... | ... | ... | ... | ... | ... | ... |
| 24 | 2018/12/14 | 15:32 | X3, Y3 | Distressing. | PERSON HIMSELF OR HERSELF (A) | SORROW | 37°C | 1 | 70 | 5 | ... | -1.625 |
| 25 | 2018/12/14 | 15:46 | X3, Y3 | NON-REGISTERED | PERSON HIMSELF OR HERSELF (A) | SORROW | 37°C | 1 | 75 | 10 | ... | -1.3 |
| 26 | 2018/12/14 | 16:04 | X3, Y3 | I want to die. | PERSON HIMSELF OR HERSELF (A) | SORROW | 37°C | 1 | 78 | 13 | ... | -3.575 |
|   |   |   |   |   |   | TOTAL |   |   |   |   |   | -11.065 |

PERSON HIMSELF OR HERSELF (A)
· BODY TEMPERATURE AT NORMAL TIMES: 36°C
· PULSE RATE AT NORMAL TIMES: 65

DEGREE OF RISK/HANDLING DETERMINATION

FIG. 9

(A) INDEX VALUE CALCULATION FORMULA

[INDEX VALUE (S)] = ([WORD EVALUATION VALUE (W)] + [VITAL EVALUATION VALUE (V)]) × [EMOTION EVALUATION VALUE (E)]

(B) WORD EVALUATION SETTING TABLE

| SPEAKER | KEYWORD | WORD EVALUATION VALUE (W) |
|---|---|---|
| OTHER PERSON | You idiot! | −0.5 |
| OTHER PERSON | You bastard! | −0.5 |
| OTHER PERSON | Bite me! | −0.3 |
| OTHER PERSON | You die! | −0.75 |
| OTHER PERSON | NON-REGISTERED | 0 |
| ... | ... | ... |
| PERSON HIMSELF OR HERSELF | Distressing. | −0.5 |
| PERSON HIMSELF OR HERSELF | I want to die. | −1.5 |
| PERSON HIMSELF OR HERSELF | NON-REGISTERED | 0 |

(C) VITAL - BODY TEMPERATURE EVALUATION SETTING TABLE

| DEVIATION RANGE OF BODY TEMPERATURE | BODY TEMPERATURE EVALUATION VALUE (V1) |
|---|---|
| 0 TO 0.2 | 0 |
| 0.3 TO 0.5 | −0.25 |
| 0.6 TO 1.0 | −0.5 |
| 1.1 TO 1.5 | −0.75 |
| 1.6 TO | −1 |

(D) VITAL - PULSE RATE EVALUATION SETTING TABLE

| DEVIATION RANGE OF PULSE RATE | PULSE RATE EVALUATION VALUE (V2) |
|---|---|
| 0 TO 2 | 0 |
| 3 TO 5 | −0.25 |
| 6 TO 10 | −0.5 |
| 11 TO 15 | −0.75 |
| 16 TO | −1 |

(E) EMOTION EVALUATION SETTING TABLE

| SPEAKER EMOTION | EMOTION EVALUATION VALUE (E) |
|---|---|
| NORMAL (0) | 1 |
| DELIGHT (1) | 0.2 |
| ANGER (2) | 1.3 |
| SORROW (3) | 1.3 |
| PLEASURE (4) | 0.2 |

(F) DEGREE OF RISK - HANDLING DETERMINATION CONDITION

| RANGE OF DEGREE OF RISK | LEVEL | HANDLING TYPE |
|---|---|---|
| 0 ≤ | 1 (NORMAL, NO PROBLEM) | FIRST HANDLING: ONLY RECORDING |
| −10 ≤, < 0 | 2 (ATTENTION, OBSERVATION REQUIRED) | SECOND HANDLING: NOTIFICATION OF ATTENTION |
| −20 ≤, < −10 | 3 (ALERT) | THIRD HANDLING: NOTIFICATION OF ALERT (IMMEDIATELY) |
| < −20 | 4 (SERIOUS RISK) | FOURTH HANDLING: DISPATCH OF SECURITY GUARD, NOTIFICATION (IMMEDIATELY) |

HARMFUL BEHAVIOR DETECTING SYSTEM AND METHOD THEREOF

RELATED APPLICATION INFORMATION

This patent claims priority from International PCT Patent Application No. PCT/JP2019/044428, filed Nov. 12, 2019 entitled, "HARMFUL ACT DETECTION SYSTEM AND METHOD", which claims priority to Japanese Patent Application No. 2019-015384, filed Jan. 31, 2019, of which are incorporated herein by reference in their entirety

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to a technique for an information processing system and the like, and more specifically, the present invention relates to an effective technique applied to observation, detection, handling support and the like regarding harmful behavior such as power harassment in work environment.

BACKGROUND ART

As a big social problem, harmful behavior such as power harassment, sexual harassment, bullying, heinous claim, or customer harassment exists. In various kinds of work environment such as a company, a school, or a store, people such as a company member, a student, or a store clerk suffer emotional (or mental) and physical anguish due to such harmful behavior. Further, the work environment is deteriorated by the harmful behavior. As concrete examples of the harmful behavior, abusive language, assault, duress, ill treatment, excessive preaching or demand, and the like are cited. General measures against such social problems merely raises awareness of education and enlightenment, or establish a consulting desk, whereby effective measures have not been realized. Such social problems socially become large cost. There is a need for a mechanism capable of supporting prevention and handling for such harmful behavior by using an information processing system or the like.

Japanese Patent Application Publication No. 2008-165097 (Patent Document 1) and Japanese Patent Application Publication No. 2017-211586 (Patent Document 2) are cited as a conventional technique example related to such social problems. Patent Document 1 describes that a voice recording apparatus aiming at early detection and suppression of bullying is provided. Patent Document 1 describes that a time zone during which an adult does not take care of behavior of a pupil is registered as a schedule in advance, voice is recorded in accordance with the schedule, keywords for slander are detected from recorded voice data, and bullying is thereby detected early. Patent Document 2 describes that a psychological analysis apparatus measures social engineering such as bank transfer fraud. Patent Document 2 describes that emotion analysis for voice data of a speaker is executed, context analysis for text data regarding the speaker is executed, a result of the emotion analysis is compared with a result of the context analysis, and psychology of the speaker is analyzed on the basis of a comparison result.

RELATED ART DOCUMENTS

Patent Documents

Patent Document 1: Japanese Patent Application Publication No. 2008-165097.
Patent Document 2: Japanese Patent Application Publication No. 2017-211586.

SUMMARY OF THE INVENTION

Problems to be Solved by the Invention

Heretofore, a mechanism that executes observation, detection, and handling for harmful behavior in work environment such as power harassment, sexual harassment, or bullying by using an information processing system has not been considered sufficiently. As a conventional technique example, a system in which a security company or the like watches over a target user by using location information and video of security cameras is cited. However, it has been impossible to determine a mental and physical state of a person related to harmful behavior. Further, as in the example of Patent Document 1, there is a technique to detect bullying or the like by using voice. However, it is determined by only the keywords, and the mental and physical state cannot be determined. There is room for improvement in detection accuracy and the like.

It is an object of the present invention to provide a technique capable of detecting harmful behavior in work environment such as power harassment, sexual harassment, or bullying by using an information processing system, and supporting handling therefor. It is another object of the present invention to provide a technique capable of detecting and caring a victim and an assailant regarding the harmful behavior, and contributing improvement or prevention of deterioration of the work environment. The other problems, effects and the like of the present invention will be described in embodiments.

Means for Solving the Problems

A representative embodiment of the present invention has a configuration described below. One embodiment provides a harmful behavior detecting system, including: a computer configured to execute observation and detection regarding harmful behavior among people in work environment, the harmful behavior including power harassment, sexual harassment, and bullying, wherein the computer is configured to: obtain data containing voice data, at least one of voice information, emotion information, or vital data of a target person, date and time information, and location information of the target person, the voice data being obtained by inputting voice around a target person, the voice information containing words that represent conversation content extracted on a basis of voice recognition from the voice, the emotion information representing emotion classified on a basis of emotion recognition from the voice data; calculate an index value regarding the harmful behavior by using at least one element of five elements on a basis of the obtained data, the five elements including words and an emotion of the other person positioned around the target person, and words, emotion, and vital data of the target person; estimate a state of the harmful behavior on a basis of the index value, the state of the harmful behavior including at least one of a victim or an assailant of the harmful behavior, and presence or absence of the harmful behavior or a degree thereof; and output handling data for handling the harmful behavior in accordance with the estimated state.

Effects of the Invention

According to the representative embodiment of the present invention, by using the information processing system, it is possible to detect harmful behavior such as power harassment, sexual harassment, or bullying in work environment, and support handling therefor. According to the representative embodiment of the present invention, it is possible to detect and care a victim and an assailant regarding such behavior, and to contribute improvement or prevention of deterioration in the work environment.

DESCRIPTION OF THE DRAWINGS

FIG. 7 is a view illustrating two patterns of occurrence of harmful behavior according to the first embodiment.

FIG. 8 is a view illustrating a configuration example of a table of obtained data according to the first embodiment.

FIG. 9 is a view illustrating a calculation formula for an index value, a setting table for evaluation of each of elements, and a setting table for a determination condition according to the first embodiment.

DETAILED DESCRIPTION

First Embodiment

A harmful behavior detecting system and a method thereof according to a first embodiment of the present invention will be described with reference to FIG. 1 to FIG. 10. The harmful behavior detecting system according to the first embodiment is a system that includes a computer for executing observation and detection regarding harmful behavior such as power harassment among people in work environment. The harmful behavior detecting method according to the first embodiment is a method that includes steps executed by the computer in the harmful behavior detecting system according to the first embodiment.

Harmful Behavior Detecting System (1)

Figure 1:
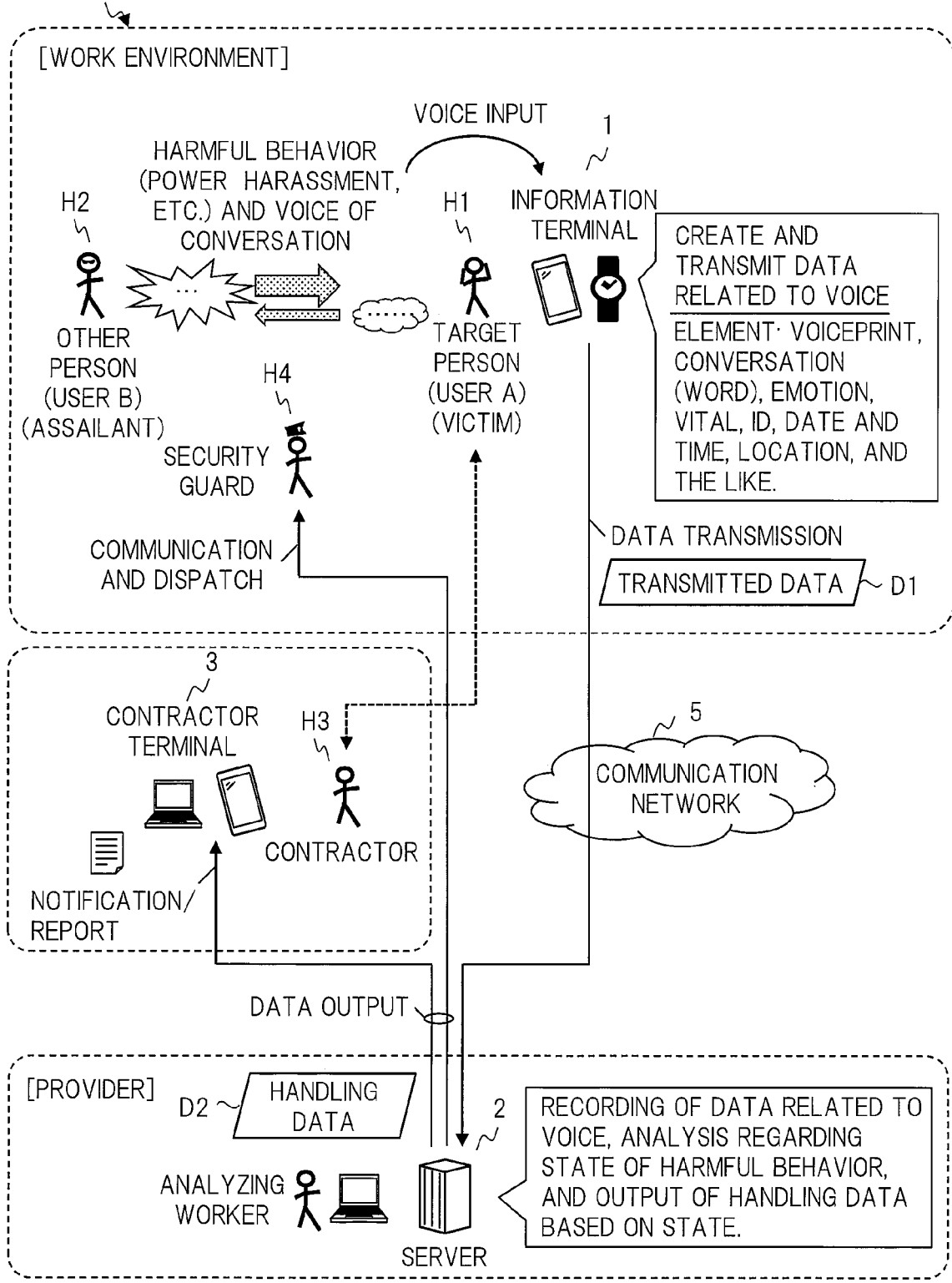
FIG. 1 is a view illustrating a configuration of a harmful behavior detecting system according to a first embodiment of the present invention.

FIG. 1 illustrates a basic configuration of the harmful behavior detecting system according to the first embodiment. The harmful behavior detecting system according to the first embodiment includes, as the computer, an information terminal 1 for a target person H1, a server 2 of a business entity (or a provider), and a contractor terminal 3 of a contractor H3. These are appropriately connected to each other for communication via a communication network 5. The information terminal 1 is a device, such as a smartphone or a wearable terminal, which the target person H1 among a plurality of persons in work environment possesses and carries. The contractor terminal 3 is a device, such as a smartphone or a PC, which the contractor H3 uses. This harmful behavior detecting system is a system that observes and detects harmful behavior on the basis of information processing of the computer, and is a system that supports handling or the like against the harmful behavior. The business entity manages the harmful behavior detecting system to provide its service.

The work environment to become an application target is a company, for example. However, it is not limited to this. Various kinds of work environment such as a school or a store (will be described later) is possible. A plurality of persons including the target person H1 and another person H2, for example, company members exist in the work environment. The target person H1 is a user who makes a contract regarding service usage of the harmful behavior detecting system, and is regarded as a user A, for example. The target person H1 is a victim of harmful behavior, for example. The other person H2 is the other person than the target person H1, and is another person in the work environment. The other person H2 is a user who does not make a contract regarding the service usage of the harmful behavior detecting system, and is regarded as a user B, for example. The other person H2 is an assailant of the harmful behavior, for example. In other words, the assailant is an aggressor, and is a person who applies stress or violence to the target person H1.

The contractor H3 is a user who has a relationship with the target person H1 who makes a contract regarding the service usage of the harmful behavior detecting system. The contractor H3 is a predetermined set person, for example, and is a person in a family of the user A (for example, a parent or a partner). A security guard H4 is a predetermined set person dispatched in the work environment as one example of handling. In a case where harmful behavior against the target person H1 is detected and a degree of the harmful behavior is large, the security guard H4 is dispatched. The security guard H4 carries out arbitration, questioning, violence suppression, protection, communication, and the like between the target person H1 and the other person H2 in accordance with a status of a spot. The security guard H4 may be a specific company member, for example, or may be the contractor H3 instead.

The information terminal 1 includes an application program and the like that constitute a harmful behavior detecting function. The information terminal 1 has a function to input surrounding voice from a microphone and obtain voice data. Further, the information terminal 1 also has a function to obtain voice information such as a text or a character string on the basis of the inputted voice data by means of a voice recognizing process. The text or the character string contains words representing the conversation content. Further, the information terminal 1 has a function to obtain an emotion of a speaker on the basis of the inputted voice data by means of an emotion recognizing process. This emotion is a value of an emotion that is selected from classifications of a plurality of predetermined emotions such as normal, delight, anger, sorrow, or pleasure. Further, the information terminal 1 has a function to execute distinction of whether the speaker is the target person H1 or the other person H2 or personal identification on the basis of the inputted voice data by means of a voiceprint recognizing process. Further, the information terminal 1 has a function as an activity amount meter that measures vital data of the target person H1.

Note that the number of the information terminal 1 possessed by the target person H1 is not limited to one. This information terminal 1 may be a plurality of information terminals that cooperates with each other, for example, and may be a set of a smartphone and a wearable terminal. The wearable terminal has a function as an activity amount meter and functions as the other sensors, for example. In the other embodiment, the information terminal 1 may include one or more PCs or the other equipment, which is fixedly installed in the work environment. In this case, the fixed information terminal 1 can obtain voice of a person in a case where the person exists in a certain distance range around the information terminal 1.

The information terminal 1 is set so that a voice input function and the like always become an on state, for example, and automatically obtains voice data of surrounding voice in the on state. The target person H1 is allowed to switch on/off of the harmful behavior detecting function by an operation. The information terminal 1 inputs therein voice associated with a conversation or the like between the target person H1 and the other person H2 positioned around the target person H1, and stores it therein as voice data. The information terminal 1 recognizes a voiceprint on the basis of the voice data, obtains voice information such as words, and obtains an emotion by classification. Further, the information terminal 1 obtains an ID, date and time, a location, and vital data together with them. The ID includes a user ID, a terminal ID, a terminal address and the like. The information terminal 1 calculates a possibility of harmful behavior and an index value regarding a state by using these data and information. The information terminal 1 stores therein various kinds of data such as the ID, the date and time, the location, the voice data, voiceprint information, the voice information, emotion information, the vital data, and the index value and the information so as to be associated with each other. The information terminal 1 constructs predetermined transmitted data D1 for state notification to the server 2 by using data containing the index value, and transmits the predetermined transmitted data D1 to the server 2.

The server 2 is a server apparatus installed in a system of the business entity such as a data center or a cloud computing system, and includes a storage device, a communicating device and the like. An analyzing worker in the business entity carries out management work and data analysis auxiliary work for the server 2. The server 2 receives the transmitted data D1 related to the voice from the information terminal 1 and stores them therein; executes analytical processing regarding the possibility or the state of the harmful behavior; creates handling data D2 based on a state of a result; and outputs them. For example, the server 2 transmits the handling data D2 to the set contractor terminal 3. The output of the handling data D2 includes immediate notification and transmission of a regular report regarding the state of the harmful behavior. Note that in consideration of privacy and the like, the business entity subjects a countermeasure process such as encryption to the data received from the information terminal 1 of the target person H1 and the set information and securely manages them in a DB or the like on the basis of the contract.

Harmful Behavior Detecting System (2)

The harmful behavior detecting system according to the first embodiment has the harmful behavior detecting function that is a function to estimate and detect harmful behavior on the basis of the analytical processing by using the voice around the target person H1, and protect the target person H1 from harmful behavior. Further, this function includes a function to execute different types of handling in accordance with the degree of the state of the harmful behavior.

Note that it is generally difficult to determine whether certain behavior corresponds to power harassment or the like or not, and it differs depending upon individual cases. The determination of harmful behavior in the harmful behavior detecting system according to the first embodiment and the function thereof is just an estimation, and deals with a possibility of harmful behavior. However, it is effective in actually preventing and verifying the harmful behavior, and supporting the handling. A person in the work environment can effectively carry out handling and care against a victim and an assailant by using information on determination by this function (the handling data D2).

In particular, the computer constituting the harmful behavior detecting system according to the first embodiment calculates an index value on the basis of a combination of five elements including words and an emotion of the other person H2 and words, an emotion, and vital data of the target person H1 himself or herself in a voice conversation. This index value is an evaluation value regarding a mental and physical state of each of the other person H2 and the target person H1. The computer grasps a change in the index value in a time series. The computer determines presence or absence of harmful behavior and a state regarding a degree (that is, a degree of risk, which will be described later) on the basis of the index value. The computer then determines handling in accordance with the state, creates and outputs corresponding handling data D2. The handling is handling that is selected from a plurality of set handling types. This allows the harmful behavior detecting system to detect harmful behavior such as power harassment, and support handling by the persons concerned. This harmful behavior detecting system can heighten detection accuracy by multiple analysis using the plurality of elements.

Service Usage Form

When service usage forms in which a user such as the target person H1 utilizes the harmful behavior detecting system according to the first embodiment in the work environment are roughly classified, there are a case where the target person H1 is a single individual and a case where the target person H1 is a group of a plurality of persons. A configuration example of FIG. 1 and the like indicates a usage form in a case where the target person H1 is a single individual. In FIG. 1, for example, a user A who is a company member as one person in the company is the target person H1, another person H2 who is another company member is not the target person and does not hold the information terminal 1. In case of this usage form, the target person H1 can protect himself or herself from harmful behavior such as power harassment in the work environment. The target person H1 and the contractor H3 can receive an indication regarding a possibility of damage by harmful behavior on the basis of handling data D2 by the harmful behavior detecting function. This causes the target person H1 and the contractor H3 to easily carry out handling against the harmful behavior. Further, to the contrary, there is a possibility that the target person H1 himself or herself unconsciously carries out harmful behavior against the other person H2. In that case, the target person H1 and the like can also receive an indication regarding a possibility of an assailant of harmful behavior by means of this function, whereby it is possible to prevent the target person H1 and the like from becoming an assailant.

Harmful Behavior

Harmful behavior is a concept that includes power harassment, sexual harassment, bullying, heinous claim, and the like, and is also a concept that includes violence behavior, criminal behavior, and the like. In FIG. 1, the harmful behavior is behavior in which the other person H2 who becomes an assailant gives emotional or physical pain or harm is to the target person H1 who becomes a victim by means of abusive language. The harmful behavior detecting function of the harmful behavior detecting system according to the first embodiment is a function to estimate and detect harmful behavior from voice with such harmful behavior by the analytical processing.

A combination of elements, such as voice, a word, an emotion, or vital, with the harmful behavior may take values of various states. For example, upon power harassment, even in a case where a word of the other person H2 is a normal word (for example, "Do this work!"), an emotion at that time may be "anger". Further, even in a case where a word of the other person H2 is a bad word (for example, "You idiot!"), an emotion at that time may be "pleasure". The computer in the harmful behavior detecting system according to the first embodiment analyzes the combination of the elements. Therefore, for the former, it is possible to estimate that there is a possibility of power harassment or the possibility is high, and for the latter, it is possible to estimate there is no possibility of power harassment or the possibility is low. Moreover, at that time, even in a case where a word of the target person H1 is a normal word (for example, "I see."), an emotion at that time may be "sorrow" and vital thereof may be bad, or the emotion may be "normal" or "pleasure" and the vital may be good. Thus, the computer particularly estimates a possibility or a degree of harmful behavior by using the system that evaluates it on the basis of the combination of the plurality of elements, whereby it is possible to estimate the possibility or the degree of harmful behavior with higher accuracy.

Work Environment

Hereinafter, a case where the harmful behavior detecting system according to the first embodiment is applied to three kinds of work environment and the corresponding case examples of harmful behavior will be described. A first example is a case in a company, a second example is a case in a school, and a third example is a case in a store. The harmful behavior detecting system according to the first embodiment is not limited to these case examples, and can be applied to various kinds of work environment and various kinds of harmful behavior in the similar manner.

Work Environment (1)—Company

Figure 2:
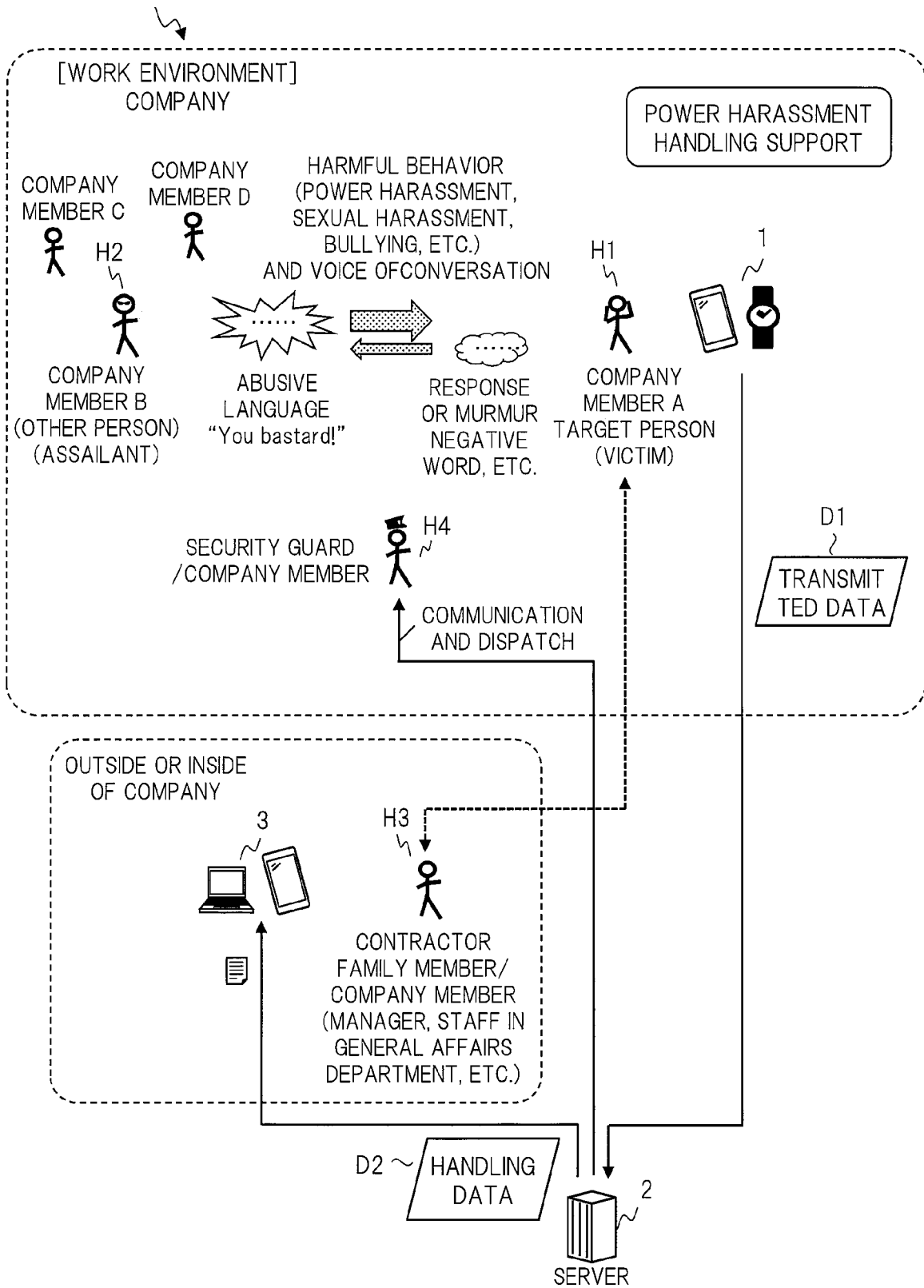
FIG. 2 is a view illustrating a first example of work environment (company) according to the first embodiment.

FIG. 2 illustrates, as the first example, a configuration example in a case where the work environment is a company. Harmful behavior of a detection target is power harassment, sexual harassment, or bullying between company members. In other words, the harmful behavior detecting system in this case becomes a power harassment detecting system and a power harassment handling support system. In the present embodiment, one company member A utilizes this service as a target person H1. As an example of a victim, there is the company member A who is the target person H1. As an example of an assailant, there is a company member B who is the other person H2. A contractor H3 who is positioned inside or outside the company is a family member of the target person H1, for example. A manager or a staff in the general affairs department of the company can be selected as the contractor H3. A security guard H4 can be a specific company member or the like.

Note that according to the Ministry of Health, Labour and Welfare, power harassment in workplace is behavior in which workers in the same workplace suffer emotional or physical anguish that exceeds an appropriate range of a job in the background of superiority in the workplace such as a job status or a relationship among persons, or work environment is deteriorated. As typical examples of the power harassment, the following is cited.

1. physical attacks (such as assault),
2. emotional (or mental) attacks (such as abusive language, assault, or insult),
3. disconnection from a relationship among persons (such as ignoring, or odd one out),
4. excessive demand (such as enforcement of unnecessary things in business or impossible to do for business),
5. too small demand (such as an order of work unreasonable in business to a low extent far from ability and experience, or no order of work), and
6. infringement of individuals (such as excessive access to private matters).

In a case where a company leaves an assailant of power harassment, the company may be questioned about a breach of obligation to adjust work environment.

Further, according to the Ministry of Health, Labour and Welfare, sexual harassment means that sexual behavior against worker's will is carried out in a workplace, and the worker suffers disadvantages such as dismissal, demotion, or reduction of salary in accordance with measures such as rejection of it, or that sexual behavior makes the work environment uncomfortable and harmful effects occur on fulfilment of ability of the worker. The Equal Employment Opportunity Law requires the business entity to take measures against sexual harassment.

In FIG. 2, the company member A may suffer harmful behavior such as power harassment from the other person H2 such as the company member B, C, or D. For example, the company member B may produce a speech of abusive language such as "You bastard!", and the company member A may produce a speech of a response word, or may be unable to respond thereto, may become silent, and may then mutter a negative word or the like. At this time, the information terminal 1 constructs transmitted data D1 on the basis of input voice, and transmits the transmitted data D1 to the server 2. The server 2 executes determination regarding a state of power harassment or the like, constructs handling data D2, and transmits the handling data D2 to the contractor terminal 3 of the contractor H3. In a case where a degree of power harassment is high, the security guard H4 is dispatched immediately.

Work Environment (2)—School

Figure 3:
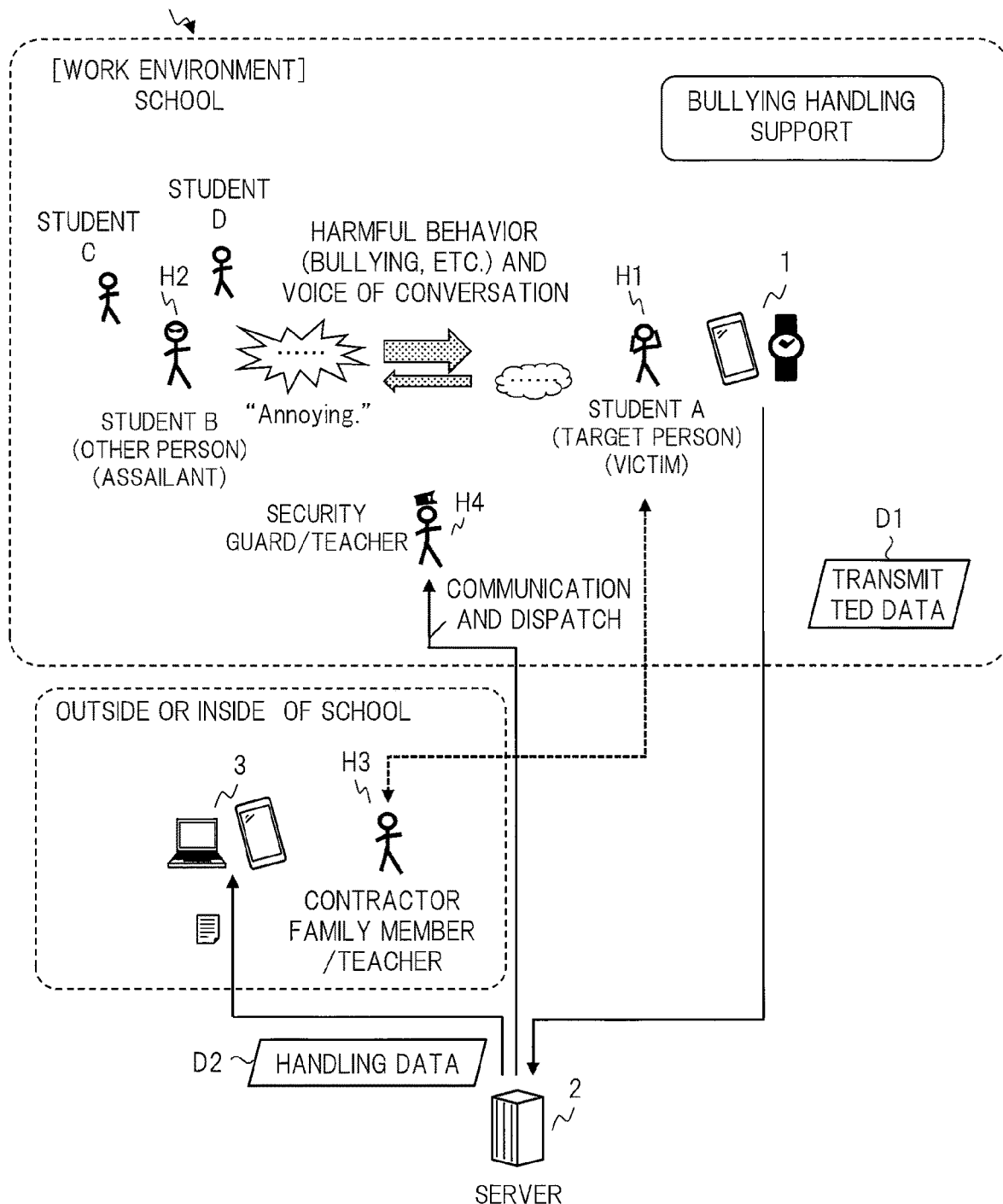
FIG. 3 is a view illustrating a second example of the work environment (school) according to the first embodiment.

FIG. 3 illustrates, as the second example, a configuration example in a case where the work environment is a school. Harmful behavior of a detection target is bullying among students, bullying between a teacher and a student, or the other violence. In other words, the harmful behavior detecting system in this case becomes a bullying detecting system and a bullying handling support system. In the present embodiment, one student A utilizes this service as a target person H1. As an example of a victim, there is the student A who is the target person H1. As an example of an assailant, there is a student B who is the other person H2. A contractor H3 who is positioned inside or outside the school is a family member of the target person H1 (for example, a parent), for example. A specific teacher can be selected as the contractor H3 or a security guard H4. Note that any teacher may become an assailant, or any teacher may become a victim.

In Act Promoting Measure to Prevent Bullying, bullying between pupils or students who are members of a school is prohibited. According to the Act Promoting Measure to Prevent Bullying, the bullying is defined as behavior in which the other pupil who has a relationship with a pupil, such as a member of a school to which the pupil belongs, and gives a psychological or physical influence onto the pupil, and the pupil who is a target of the behavior thereby feels physical and psychological anguish or distress.

In FIG. 3, the student A may suffer bullying from the other person H2 such as the student B, a student C or D. At this time, the information terminal 1 similarly transmits transmitted data D1 to the server 2. The server 2 executes determination regarding a state of bullying, and transmits handling data D2 to a contractor terminal 3 or the like of the contractor H3. The contractor H3 can confirm whether the target person H1 suffers bullying or not on the basis of notification or a report.

Work Environment (3)—Store

Figure 4:
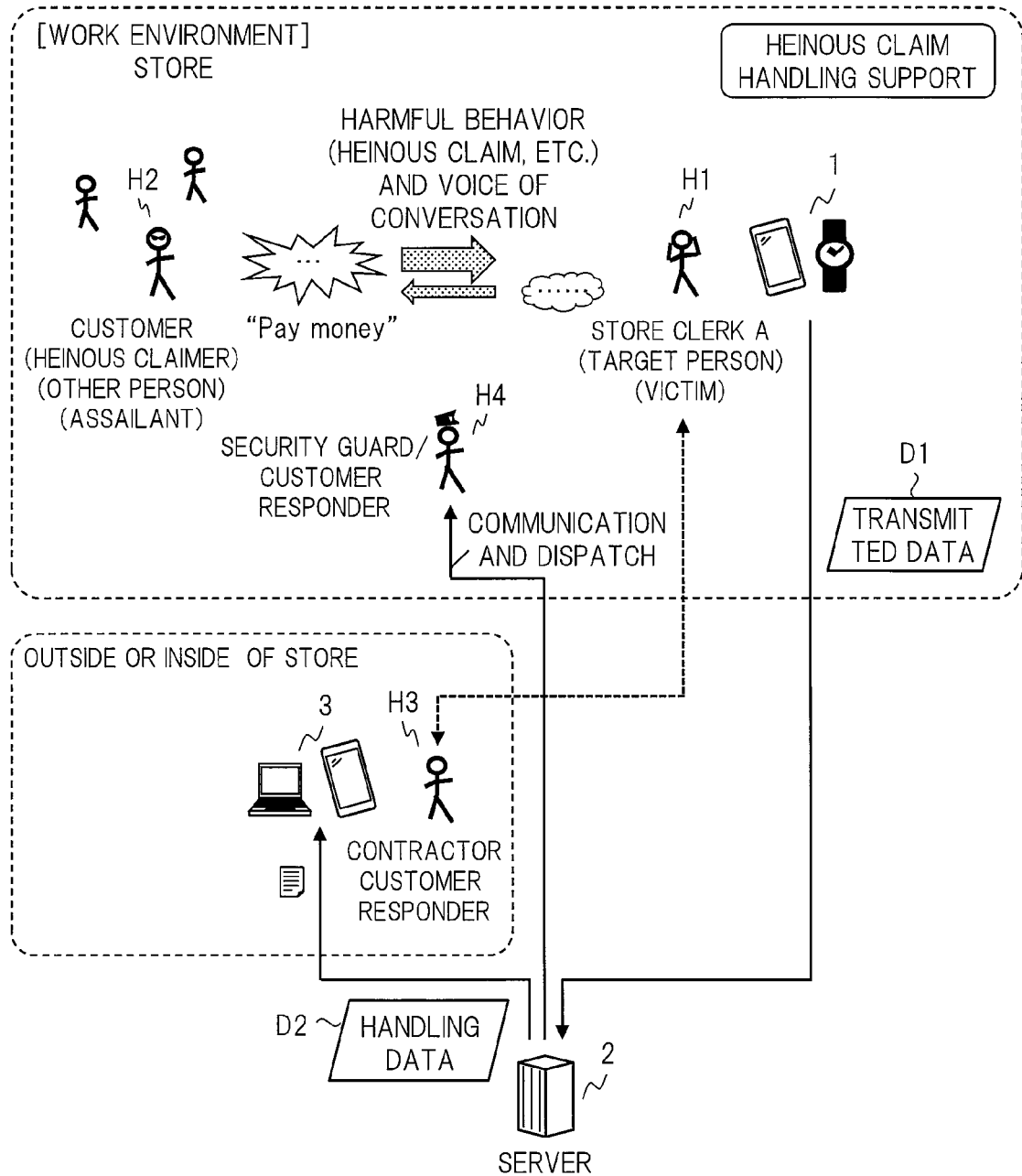
FIG. 4 is a view illustrating a third example of the work environment (store) according to the first embodiment.

FIG. 4 illustrates, as the third example, a configuration example in a case where the work environment is a store. Harmful behavior of a detection target is particularly annoying behavior such as heinous claim from a customer (in other words, a heinous claimer) to a store clerk. In other words, the harmful behavior detecting system in this case becomes a heinous claim detecting system and a heinous claim handling support system. In the present embodiment, one store clerk A utilizes this service as a target person H1. As an example of a victim, there is the store clerk A who is the target person H1. As an example of an assailant, there is a customer who corresponds to a heinous claimer who is the other person H2. A contractor H3 who is positioned inside or outside the store is a customer responder of a customer service room in the store, the other store clerk, or a manager, for example. The store clerk such as the customer responder may be selected as a security guard H4.

The heinous claimer is a person who does not make an essential proper claim against the store clerk A, but makes a heinous claim (in other words, customer harassment). As an example of the heinous claim, there is a claim that is made with unreasonable abuse, preaching, or requesting that a store, a product, or service is defective or serious even in a case where there is no defect or a minor defect.

In FIG. 4, the store clerk A may suffer a heinous claim from a customer. At this time, the information terminal 1 similarly transmits transmitted data D1 to the server 2. The server 2 executes determination regarding a state of a heinous claim, and transmits handling data D2 to the contractor terminal 3 or the like of the contractor H3. The contractor H3 can confirm whether the heinous claim occurs or not, and carry out handling immediately. In a case where a degree of heinous claim is high, the security guard H4 is dispatched immediately.

Processing Flow (1)

Figure 5:
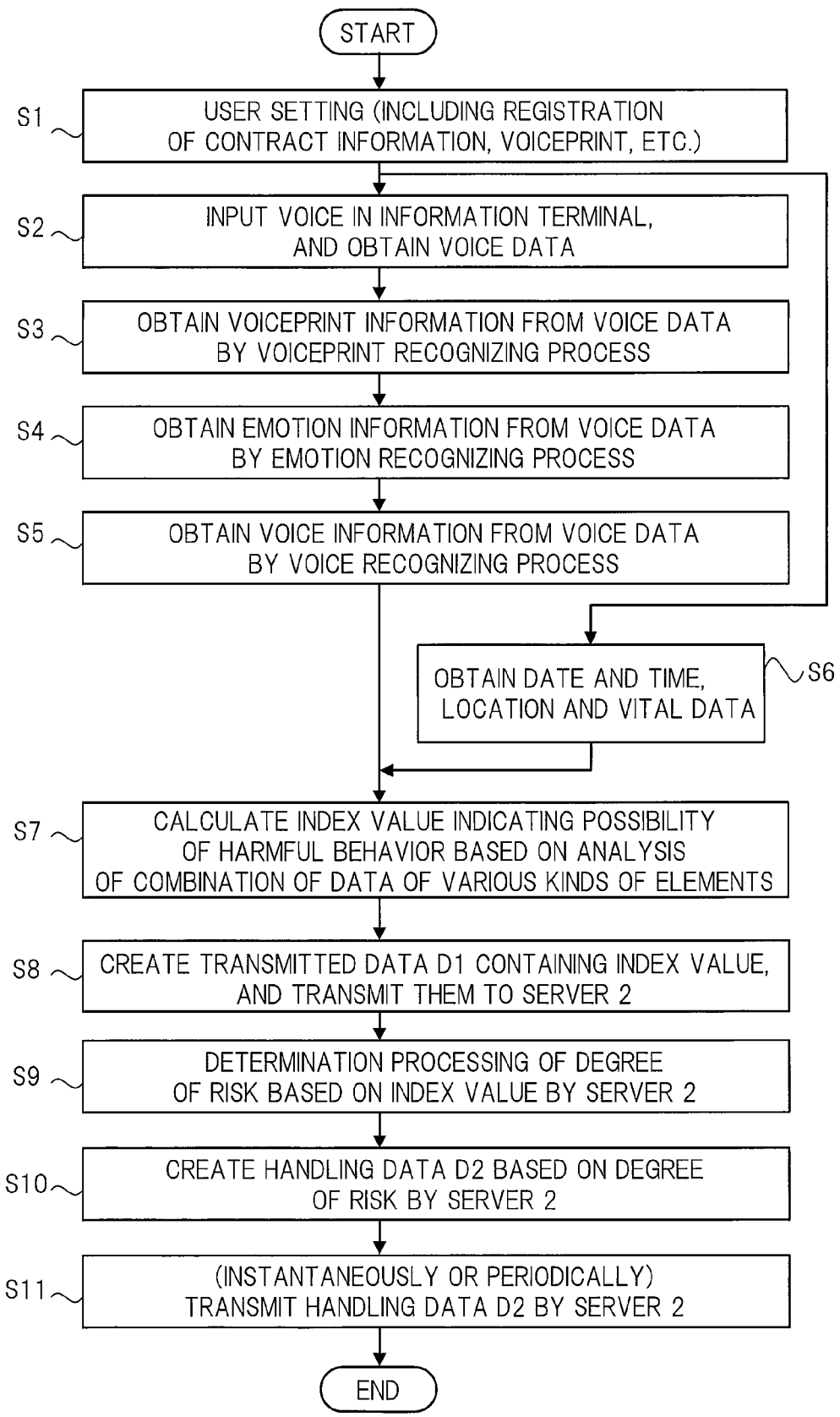
FIG. 5 is a view illustrating a processing flow of a computer according to the first embodiment.

FIG. 5 illustrates a flow of main processes by the harmful behavior detecting system according to the first embodiment. This flow has Steps S1 to S11. Hereinafter, it will be described in order of steps. The subject of the processes is the computer. The flow of FIG. 5 corresponds to a configuration example of FIG. 6 (will be described later).

At Step S1, user setting in the harmful behavior detecting system is executed in advance. In this user setting, various kinds of information regarding service usage contract between the target person H1 and the contractor H3 are set to the information terminal 1 and a customer DB 51 in a DB 50 of the server 2 illustrated in FIG. 6. This set information contains information such as a user ID, a contact address of the information terminal 1 for the target person H1, or a contact address of the contractor terminal 3 of the contractor H3. Further, this set information contains information such as a determination condition related to the harmful behavior detecting function, a handling type, or timing of notification or a report. Further, this set information contains data on a voiceprint based on voice of the target person H1 (hereinafter, referred to as "voiceprint data"). Voiceprint data of each target person H1 are registered in a voiceprint DB (not illustrated in the drawings) in the DB 50 of FIG. 6.

At Step S2, the information terminal 1 automatically inputs therein surrounding voice from the microphone in the on state of the harmful behavior detecting function including the voice input function, and obtains the surrounding voice as voice data. The voice at this time includes voice of the target person H1 himself or herself, or voice of the other person H2 positioned around the target person H1, and they are not distinguished from each other at this point of time.

At Step S3, the information terminal 1 executes a voiceprint recognizing process from the voice data. The information terminal 1 extracts a voiceprint from the voice data by this voiceprint recognizing process; compares the inputted voiceprint with the voiceprint data of the target person H1 of the voiceprint DB (not illustrated in the drawings) in a DB 40 of FIG. 6 in the information terminal 1; and distinguishes whether a speaker in each voice section is the target person H1 or the other person H2. This voiceprint DB has the content corresponding to that of a voiceprint DB provided in the server 2 side. Further, individual identification may be executed in this voiceprint recognizing process. In that case, the information terminal 1 identifies which person the other person H2 who is a speaker is from the inputted voiceprint. Information obtained as a result of this voiceprint recognizing process is referred to as "voiceprint information", and contains information on at least distinction between the target person H1 and the other person H2.

At Step S4, the information terminal 1 executes an emotion recognizing process from the voice data. In this emotion recognizing process, the information terminal 1 compares a waveform of the inputted voice data, particularly characteristics of frequency and the like with waveform data in an emotion DB (not illustrated in the drawings) of the DB 40 of FIG. 6 in the information terminal 1, and analyzes it. This emotion DB has the content corresponding to that of an emotion DB provided in the server 2. Thus, the information terminal 1 estimates an emotion of the speaker (that is, the target person H1 or the other person H2 distinguished at Step S3) as a value of one emotion among classification values of a plurality of predetermined emotions (normal, delight, anger, sorrow and pleasure). Information obtained as a result of this emotion recognizing process is referred to as "emotion information", and contains at least the values of the emotions described above.

At Step S5, the information terminal 1 executes a voice recognizing process from the voice data to obtain voice information. In this voice recognizing process, the information terminal 1 compares a text recognized from the voice data with keywords of a keyword DB (not illustrated in the drawings) of the DB 40 of FIG. 6 in the information terminal 1, and detects a corresponding word. This keyword DB has the content corresponding to that of a keyword DB provided in the server 2. Thus, the information terminal 1 detects a word representing a possibility of harmful behavior from the conversation content. Information obtained as a result of this voice recognizing process is referred to as "voice information", and contains at least the words described above.

On the other hand, a process at Step S6 is executed in parallel to the processes at Steps S2 to S5. Note that the order of the processes at Steps S3 to S5 may be changed into the other order. At Step S6, the information terminal 1 obtains date and time corresponding to the voice input at that time (for example, year, month, day, hour, minute, and second), and a location of the information terminal 1 (for example, location information by GPS or the like). Further, the information terminal 1 measures and obtains vital data of the target person H1 in accordance with the date and time. Items of the vital data includes a pulse rate and a body temperature, for example. However, the items are not limited to these, and can include any items.

At Step S7, the information terminal 1 associates each of the data and the information obtained at Steps S2 to S6 with each other, and temporarily stores them in a memory. The information terminal 1 uses the plurality of elements in the data and the information obtained at the respective Steps described above, that is, the date and time, the location, the voiceprint, the words, the emotion, and the vital data to calculate an index value that represents a possibility or a state of the harmful behavior. This index value is acquired at every point of time of date and time. Further, in a case where data of the plurality of elements at a certain point of time are obtained, this index value is calculated by means of analysis of the plurality of elements, particularly a combination of the words, the emotion, and the vital data. This index value basically becomes a large negative value in a case where the possibility of the harmful behavior is high. The index value becomes a large positive value in a case where the possibility of the harmful behavior is low. The information terminal 1 temporarily stores the calculated index value in a memory (for example, the DB 40 of FIG. 6) so that it is associated with each of the data. Note that in the configuration example of FIG. 6 according to the first embodiment, this index value is calculated in the information terminal 1, but in a second embodiment (will be described later), this index value is calculated in the server 2.

At Step S8, the information terminal 1 creates predetermined transmitted data D1 containing the index value calculated at Step S7, subjects it to encryption, and transmits it to the server 2. The transmitted data D1 contain information such as an ID of the information terminal 1, an ID of the target person H1, the date and time and the location obtained at Step S6, the voiceprint information obtained at Step S3 (distinction between the target person H1 and the other person H2), or the index value obtained at Step S7. In the first embodiment, the transmitted data D1 do not contain the voice data obtained at Step S2, the voice information obtained at Step S5, the emotion information obtained at Step S4, and the vital data obtained at Step S6. In the other embodiment, these data may be contained in the transmitted data D1 in accordance with the user setting.

Figure 6:
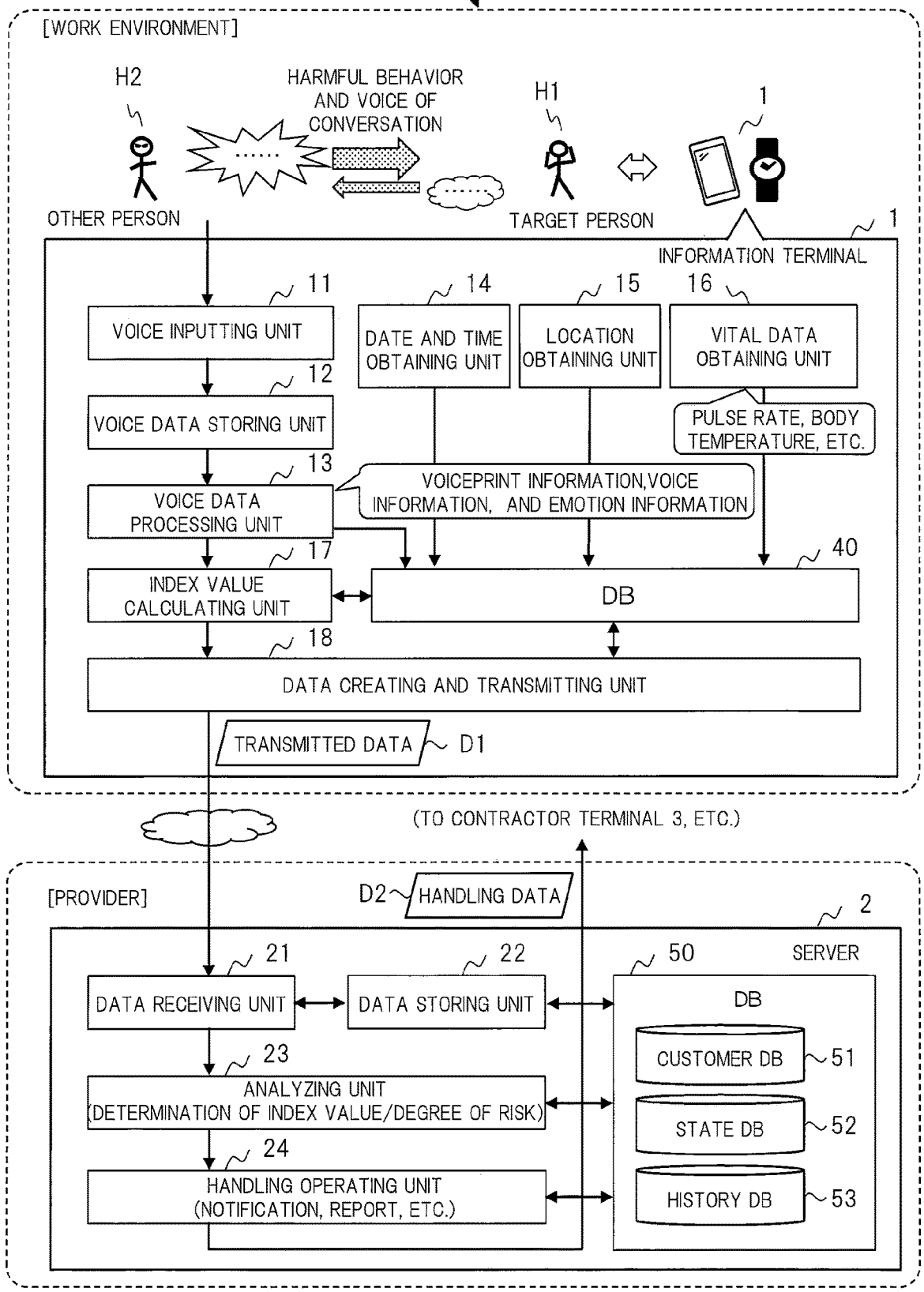
FIG. 6 is a view illustrating configurations of an information terminal and a server according to the first embodiment.

At Step S9, the server 2 decodes the transmitted data D1 received from the information terminal 1, and stores them in the memory and a state DB 52 of the DB 50 in FIG. 6. The server 2 takes, from the transmitted data D1, information such as the ID of the information terminal 1, the ID of the target person H1, the date and time, the location, or the index value. The server 2 compares the index value at each point of time in a time series with a predetermined determination condition, thereby determining a degree of risk that is the index value regarding a possibility of harmful behavior and a state of the target person H1. This degree of risk is an evaluation value regarding the mental and physical state of the target person H1, which is based on the possibility and the degree of the harmful behavior. As a more concrete system, the server 2 sums up an index value at each point of time, and set a total index value at that time to the degree of risk. The server 2 compares the degree of risk with a plurality of predetermined threshold ranges to determine to which level of a plurality of levels the degree of risk corresponds. Note that as a system of another embodiment, the index value at each point of time may be set to the degree of risk as it is. Calculation of the degree of risk is not limited to the total of the index value at each point of time, and may be executed by another sum-up system.

At Step S10, the server 2 determines a type of handling from the degree of risk determined at Step S9. As a concrete system, the server 2 selects the type of handling to be associated (notification, a report, dispatch of a security guard, or the like) in accordance with the level of the degree of risk. The server 2 then creates the handling data D2 based on the type of handling. In a case where the handling is notification, the server 2 creates information on notification containing predetermined information in accordance with set notification procedure and set information. In a case where the handling is a report, the server 2 creates report data containing predetermined information in accordance with set report creating procedure and set information.

At Step S11, the server 2 outputs the handling data D2 to a contact address of the contractor terminal 3 or the like (an IP address, a mail address, or a telephone number) according to the type of handling on the basis of the information in the customer DB 51 of FIG. 6. In a case where the handling is immediate notification, the server 2 immediately transmits notification information, which is the handling data D2, to the contractor terminal 3 and the like. In a case where the handling is a report, the server 2 transmits report data, which are the handling data D2, to the contractor terminal 3 or the like at regular timing corresponding to a report presenting interval. The regular timing of the report can be set by unit such as one day or one week. Further, in a case where the handling is dispatch of a security guard, at Step S11, the server 2 communicates with a contact address of the prescribed security guard H4 to send an instruction of dispatch containing information on the ID of the target person H1, a place or an area in work environment corresponding to the location.

This flow is terminated after Step S11. Each Step in this flow is similarly repeated. In other words, Steps S9 to S11 are steps for monitoring regarding the harmful behavior by the server 2.

System Configuration Example (1)

FIG. 6 illustrates, as a more detailed configuration example, configurations of the information terminal 1 and the server 2 in the harmful behavior detecting system according to the first embodiment as illustrated in FIG. 1. In this configuration example, the information terminal 1 and the server 2 cooperate with each other to share the whole processing of the harmful behavior detecting function. The information terminal 1 executes, as a part of the processing, acquisition of each of data and calculation of an index value, and the server 2 executes, as the other part of the processing, determination of a degree of risk and output of handling data.

Although it is not illustrated, the information terminal 1 includes, as general constituent elements, a processor constituted by a CPU, a ROM, a RAM, and the like, a memory, a communication interface circuit, input/output devices such as a microphone, a speaker, or a touch panel, operation buttons, various kinds of sensors, and a battery. They are connected to each other via a system bus. An application program, the DB 40, user setting information and the like for realizing the harmful behavior detecting function are held in the information terminal 1. Information related to a certain user (the target person H1) is stored in the DB 40 of the information terminal 1 side.

The information terminal 1 includes, as functional blocks, a voice inputting unit 11, a voice data storing unit 12, a voice data processing unit 13, a date and time obtaining unit 14, a location obtaining unit 15, a vital data obtaining unit 16, an index value calculating unit 17, a data creating and transmitting unit 18. Each of the functional blocks is configured by software program processing by a processor or the like, or circuits (for example, IC chips).

The voice inputting unit 11 obtains voice inputted from the microphone as voice data. The voice data storing unit 12 stores the voice data from the voice inputting unit 11 in the memory for processing. Note that although it will be described later, setting in which the voice data are not saved after processing, that is, setting in which the voice data are erased is also possible.

The voice data processing unit 13 subjects the voice data of the voice data storing unit 12 to predetermined processing, thereby obtaining voiceprint information, voice information, emotion information and the like. Specifically, the voice data processing unit 13 includes a voiceprint recognition processing unit, a word recognition processing unit, an emotion recognition processing unit and the like.

The voiceprint recognition processing unit obtains the voiceprint information on the basis of a voiceprint recognizing process from the voice data. The voiceprint information is information on distinction and identification of a speaker based on a voiceprint. The voiceprint recognition processing unit compares a voiceprint of the input voice data with voiceprint data of the voiceprint DB in the DB 40 of the information terminal 1 to distinguish whether the speaker is the target person H1 or the other person H2. The voiceprint recognition processing unit identifies the individual and specifies a user ID thereof if possible. As the voiceprint recognizing process, known techniques can be utilized. Note that the voiceprint DB in the information terminal 1 may be a DB obtained from a voiceprint DB (not illustrated in the drawings) in the DB 50 of the server 2, or may be replaced by a process to refer to the voiceprint DB of the server 2 side without obtaining the DB.

The emotion recognition processing unit obtains the emotion information on the basis of an emotion recognizing process from the voice data. The emotion information indicates a value selected from five kinds of values including normal, delight, anger, sorrow and pleasure, for example, as values for classification of emotions. As the emotion recognizing process, known techniques can be utilized. Since a state of the emotion is reflected to characteristics such as frequency in a waveform of the voice data, the emotion can be estimated by the emotion recognizing process. The emotion recognition processing unit compares a waveform of the input voice data with emotion waveform data of the emotion DB in the DB 40 of the information terminal 1, thereby executing classification of the emotion. Note that the emotion DB in the information terminal 1 may be a DB obtained from an emotion DB (not illustrated in the drawings) in the DB 50 of the server 2, or may be replaced by a process to refer to the emotion DB of the server 2 side without obtaining the DB. The values of the emotions are not limited to the above, and may be values of finer classifications.

The word recognition processing unit obtains the voice information containing a text or a word that represents the conversation content on the basis of a voice recognizing process from the voice data. As the voice recognizing process, known techniques can be utilized. The word recognition processing unit compares a word extracted from the input voice data by means of voice recognition with keywords of the keyword DB in the DB 40 of the information terminal 1, thereby extracting a corresponding word. Note that the keyword DB in the information terminal 1 may be a DB obtained from a keyword DB (not illustrated in the drawings) in the DB 50 of the server 2, or may be replaced by a process to refer to the keyword DB of the server 2 side without obtaining the DB.

The date and time obtaining unit 14 uses a clock to obtain current date and time information. The location obtaining unit 15 uses a GPS receiver or an indoor positioning system to obtain current location information. The location information may be information on latitude and longitude, for example, or may be information on a floor or an area in a company, for example. The vital data obtaining unit 16 uses a function of an activity amount meter of the information terminal 1 to measure a pulse rate, a body temperature, and the like of the target person H1, thereby obtaining vital data for each item.

The index value calculating unit 17 refers to data that can be obtained among the voice data, the voiceprint information, the voice information, the emotion information, the date and time information, the location information, and the vital data described above. The index value calculating unit 17 uses these data to calculate an index value regarding harmful behavior on the basis of analysis of a combination of elements. Note that even in a case where only one of the elements such as the word, the emotion, or the vital data can be obtained, reasonable estimate is possible by using the one element. Further, the elements used when the index value is calculated can be changed by the user setting. Default setting is setting in which all elements of the word, the emotion, and the vital data are used. However, various kinds of settings such as only the word, only the emotion, only the vital data, a combination of the word and the emotion, a combination of the emotion and the vital data, or a combination of the word and the vital data are possible. Note that in the first embodiment, each of the index value and the evaluation value is defined as a value that increases or decreases in a positive or negative direction (for example, −1.5, −1, 0, +0.5, and +1). However, they are not limited to this, and may be a value with the other definition (for example, a value equal to or more than zero, or a percentage (%)).

The data creating and transmitting unit 18 refers to data containing the index value described above. The data creating and transmitting unit 18 uses these data to construct predetermined transmitted data D1; subjects the constructed data to encryption or the like; and transmits them to the server 2. In the first embodiment, the transmitted data D1 are data that contain an ID of the information terminal 1, an ID of the target person H1, date and time, a location, distinction of a speaker, and the index value, but do not contain the voice data as described above. In the first embodiment, since the voice data are not transmitted on the communication network 5, it is possible to reduce a load on the communication network 5.

Although it is not illustrated, the server 2 includes, as general constituent elements, a processor constituted by a CPU, a ROM, a RAM, and the like, a memory, a communication interface circuit, an input/output device, and the like. They are connected to each other via a system bus.

The server 2 includes, as functional blocks, a data receiving unit 21, a data storing unit 22, an analyzing unit 23, a handling operating unit 24, and the DB 50. The DB 50 is configured by a storage device, a DB server, and the like. Specifically, the DB 50 includes the customer DB 51, the state DB 52, a history DB 53, and the like, and the voiceprint DB (not illustrated in the drawings), the keyword DB, the emotion DB, and the like. Each of functional blocks is configured by software program processing by a processor or the like, or circuits (for example, IC chips). Server programs, the DB 50, the set information and the like for realizing the harmful behavior detecting function are held in the server 2. Information related to a plurality of users is stored in the DB 50 of the server 2 side.

The data receiving unit 21 receives the transmitted data D1 from the information terminal 1; executes processes such as decryption; and obtains data in the transmitted data D1. The data storing unit 22 stores the transmitted data D1 and each of the data in a memory for processing and the DB 50. The data storing unit 22 stores data containing the index value at each point of time in the state DB 52. The analyzing unit 23 uses the data in the transmitted data D1 such as the index value to determine the degree of risk regarding the harmful behavior and a state of the target person H1. The analyzing unit 23 stores the determined degree of risk in the state DB 52.

The handling operating unit 24 determines a type of handling in accordance with the degree of risk of the target person H1; creates the corresponding handling data D2; and transmits them to a contact address of the contractor terminal 3 and the like. Specifically, the handling operating unit 24 includes a notifying unit configured to execute immediate notification, a reporting unit configured to create and transmit report data, a security guard dispatching unit configured to dispatch the security guard H4, and the like.

The data in the DB 50 are encrypted. Service contract information, user setting information, and the like regarding the target person H1 and the contractor H3, who are customers for the business entity, are set in the customer DB 51. Information of the index value and the degree of risk of each target person H1 is held in the state DB 52 together with their histories of change in a time series. History information on handling (output of the handling data D2) in a time series for each target person H1 is held in the history DB 53. The voiceprint data for each target person H1 are registered in the voiceprint DB. Waveform data for the emotion recognizing process are registered in the emotion DB. Keywords for a word recognizing process are registered in the keyword DB. Further, the server 2 provides, as a user interface, a user setting screen or the like constituted by a Web page, for example, to the information terminal 1 of the target person H1 who is a user and the contractor terminal 3 of the contractor H3 who is a user.

Analysis

The computer in the harmful behavior detecting system according to the first embodiment calculates an index value regarding harmful behavior on the basis of analysis of data of the plurality of elements obtained on the basis of the voice described above, that is, a combination of five elements including the words and the emotion of the other person H2 and the words, the emotion, and the vital data of the target person H1, and determines a degree of risk. A system for this analysis will be described below.

First, with respect to five elements in a case where distinction between the target person H1 and the other person H2 described above is considered, or three kinds of elements in a case where the distinction between the target person H1 and the other person H2 is not considered, an index value for each element (referred to also as an "evaluation value") can be calculated. Namely, each of an index value regarding words (referred to also as a "word evaluation value"), an index value regarding an emotion (referred to also as an "emotion evaluation value"), and an index value regarding vital data (referred to also as a "vital evaluation value") can be calculated independently. For example, in case of determination by only the words, it is possible estimate a possibility of harmful behavior to a certain extent on the basis of whether the words correspond to a specific keyword or not. However, there is a problem about accuracy such as a situation that a specific keyword does not necessarily indicate harmful behavior. Further, in case of determination by only the vital data, it is possible to estimate a possibility of harmful behavior on the basis of a deviation from vital values at normal times to a certain extent. However, there is a problem about accuracy such as a situation that it cannot be distinguished from a case where a target person merely feels physically sick.

Moreover, in order to heighten accuracy, the index value can be calculated by multiple analysis based on a combination of two or more elements (corresponding evaluation values). For example, a system in which the index value is determined by a combination of words and an emotion, or a system in which the index value is determined by a combination of words, an emotion, and vital data can be applied thereto. This makes it possible to heighten accuracy regarding estimate of harmful behavior. The harmful behavior detecting system according to the first embodiment calculates an index value to which three elements are reflected by using a calculation formula defined by a combination of a word evaluation value, an emotion evaluation value, and a vital evaluation value, for example.

Harmful Behavior Occurrence Pattern

FIG. 7 illustrates two patterns of an occurrence status of harmful behavior. FIG. 7(A) illustrates a first pattern. In the present embodiment, in work environment such as a company, a user A is a target person H1 and a victim, and a user B is another person H2 and an assailant. A longitudinal direction in FIG. 7 schematically illustrates time series. As the conversation content, the user B produces a speech of a word w1 (example: abuse such as "You don't have to come") related to harmful behavior such as power harassment to the user A. An emotion e1 (example: anger) is associated with this word w1 on the basis of emotion recognition. The user A cannot talk back against the word w1 of the user B, and is patient, whereby a response is silent. For that reason, data on words and an emotion at this time cannot be obtained, but vital data v1 can be obtained. Stress in this situation is reflected to the vital data v1. For example, each of a pulse rate and a body temperature becomes a state in which a deviation from values at normal times becomes larger. Thus, in case of the first pattern, as data, data on three elements including the word w1 of the other person H2, the emotion e1, and the vital data v1 of the target person H1 himself or herself can be obtained.

Similarly, FIG. 7(B) illustrates a second pattern. As the conversation content, the user B produces a speech of a word w2 (example: abuse such as "You bastard!") related to harmful behavior such as power harassment to the user A. An emotion e2 (example: anger) is associated with this word w2 on the basis of the emotion recognition. The user A produces, as a response, a speech of a word w3 (example: "I'm sorry.") against the word w2 of the user B. An emotion e3 (example: sorrow) is associated with the word w3 on the basis of the emotion recognition, and vital data v3 at this time are obtained. Stress in this situation is reflected to the emotion e3 and the vital data v3. In this case, as data, data on five elements including the word w2 and the emotion e2 of the other person H2, and the word w3, the emotion e3, and the vital data v3 of the target person H1 can be obtained. Further, in a situation of alone, the user A then produces a speech of a word w4 (example: "I want to die.") corresponding to a murmur of a negative word. An emotion e4 (example: sorrow) is associated with this word w4, and vital data v4 can be obtained. Thus, in case of the second pattern, at least three elements including the words w3 and w4, the emotion e3 and e4, and the vital data v3 and v4 of the target person H1 can be obtained. Moreover, five elements including the word w2 and the emotion e2 of the other person H2 and the words, the emotion, and the vital data of the target person H1 can be obtained.

An analysis example in case of the first pattern is as follows. First, an index value can be calculated from a combination of the word w1 and the emotion e1 of the other person H2. Moreover, an index value can also be calculated from a combination of the word w1 and the emotion e1 of the other person H2 and the vital data v1 of the target person H1. A degree of risk x1 at that time can be calculated from any one of the index values. The server 2 compares the degree of risk x1 with a threshold value to determine a level, whereby handling according to the level can be determined.

An analysis example in case of the second pattern is as follows. First, an index value can be calculated from a combination of the word w2 and the emotion e2 of the other person H2. Further, an index value can be calculated from a combination of the word w3, the emotion e3, and the vital data v3 of the target person H1. Moreover, an index value can be calculated from a combination of five elements including the word w2 and the emotion e2 of the other person H2 and the word w3, the emotion e3, and the vital data v3 of the target person H1. A degree of risk x3 at that time can be calculated from any one of the index values. The server 2 compares the degree of risk x3 with a threshold value to determine a level, whereby handling according to the level can be determined. Similarly, at a next point of time, an index value can be calculated from a combination of the word w4, the emotion e4, and the vital data v4 of the target person H1. A degree of risk x4 that is updated at that point of time can be calculated from the index value. The server 2 compares the degree of risk x4 with a threshold value to determine a level, whereby handling according to the level can be determined.

As the analysis examples described above, the harmful behavior detecting system according to the first embodiment calculates the index value and the degree of risk from the combination of the plurality of elements, whereby it is possible to estimate a possibility of the harmful behavior and a state of the target person H1 with high accuracy. The harmful behavior detecting system has a function to execute analytical processing for each of the case of the first pattern in which there is no speech of the target person H1 and the case of the second pattern in which there is a speech of the target person H1. The handling can be carried out in each of the patterns. Further, the harmful behavior detecting system can set a handling pattern and elements.

Obtained Data Table

FIG. 8 illustrates a configuration example of a table in which data in time series are stored. The table can be taken in the state DB 52 in the DB 50 of the server 2 on the basis of the transmitted data D1 from the information terminal 1 of the target person H1. In this table, a direction of row numbers (#) corresponds to time series. Each row indicates a group of data that are obtained at each point of time, and each column corresponds to data of each element. Note that in the present embodiment, this table indicates a case where not only an index value but also elements including a word, an emotion, vital data and the like are stored as obtained data. In case of a system in which the word and the like are contained in the transmitted data D1, the server 2 stores the obtained data containing the word and the like in the table of the state DB 52. In case of a system in which the word and the like are not contained in the transmitted data D1, a part of data is stored in a table of a DB in the information terminal 1 side, and the other part of the data is stored in a table of a DB in the server 2 side so that the data are shared by the information terminal 1 and the server 2.

This table includes, as items corresponding to the columns, the row numbers (#), date, time, a location, a word, a speaker voiceprint, a speaker emotion, a body temperature, a body temperature deviation, a pulse rate, a pulse rate deviation, and an index value (a degree of risk). Further, although it is not illustrated, a body temperature (for example, 36° C.) and pulse rate (for example, 65) of the target person H1 at normal times are set to the table. The "date" and "time" items correspond to the date and time information (year, month, day, hour, and minute) described above. The "location" item corresponds to the location information described above, and indicates abstracted latitude and longitude herein. The "word" item corresponds to the word in the voice information described above. The "speaker voiceprint" item corresponds to the voiceprint information described above, and indicates a user ID for distinction or identification of a speaker. For example, the target person H1 himself or herself is user ID=A. The "speaker emotion" item corresponds to the emotion information described above, and indicates any of five kinds of values including normal, delight, anger, sorrow and pleasure. The "body temperature" item corresponds to a body temperature data item of the vital data described above. The "body temperature deviation" item indicates a deviation between a "body temperature" value of the target person H1 and a body temperature value at normal times, which is set in advance. The "pulse rate" item corresponds to a pulse rate data item of the vital data described above. The "pulse rate deviation" item indicates a deviation between the "pulse rate" value of the target person H1 and a pulse rate value at normal times, which is set in advance.

The "index value (degree of risk)" item is an index value that represents a possibility and a state of harmful behavior at each point of time. The index value at each time point is a value calculated from elements such as a word, an emotion, or vital data. The index value is basically calculated so that the lower the possibility of the harmful behavior is, the positively larger value the index value becomes, and the higher the possibility of the harmful behavior is, the negatively larger value the index value becomes. An "index value" of a "total" row is a total value of index values at respective time points regarding the same target person H1, and indicates a degree of risk of a state of the target person H1 at the latest point of time. In the first embodiment, the degree of risk that is this total index value is used for determination of handling. Data are similarly stored for each target person H1 in this table, and a current state of each target person H1 is held therein.

Conditions

FIG. 9 further illustrates a setting example of conditions regarding calculation of an index value and a degree of risk.

This condition is set in advance to the harmful behavior detecting system according to the first embodiment. FIG. 9(A) indicates a calculation formula for the index value. The calculation formula for a basic index value is "[index value (S)]=([word evaluation value (W)]+[vital evaluation value (V)])×[emotion evaluation value (E)]". The index value is indicated by a symbol S, the word evaluation value is indicated by a symbol W, the vital evaluation value is indicated by a symbol V, and the emotion evaluation value is indicated by a symbol E. Namely, this calculation formula is a formula in which multiple evaluation is executed by multiplying both an evaluation value regarding a word of a speaker and an evaluation value regarding vital data of the target person H1 by an evaluation value regarding an emotion of the speaker as a coefficient. As a concrete example, there are two items (a body temperature and a pulse rate) in the vital data. In that case, when a body temperature evaluation value is V1 and a pulse rate evaluation value is V2, the calculation formula becomes "S=(W+V1+V2)×E". It is also possible in a case where three or more items are used.

Note that in another embodiment, the calculation formula for the index value may be replaced by another formula. For example, in a case where word evaluation is not used, by setting "W=0", the calculation formula can become "S=V× E". In a case where vital data evaluation is not used, by setting "V=0", the calculation formula can become "S=W× E". In a case where emotion evaluation is not used, by setting "E=1", the calculation formula can become "S=(W+ V)". Further, in case of a system in which a relationship between words and vital is evaluated, the calculation formula may become not only "S=W+V", but also "S=W×V". Further, in case of a system in which each of the elements has weighting, by using a coefficient of each element (Cw, Cv, Ce), for example, the calculation formula may become "S=(Cw×W+Cv×V)×(Ce×E)". Note that in a case where such other systems are used, a different evaluation system (setting table) may be set in accordance with them.

FIG. 9(B) illustrates a setting table regarding the word evaluation as one of the setting tables regarding the conditions. In this table, keywords for estimating harmful behavior from the speech content are set in advance. This table has, as columns, a speaker, a keyword, and a word evaluation value (W). The "speaker" item indicates distinction between the target person H1 himself or herself and the other person H2. The "keyword" item indicates keywords each representing a possibility of the harmful behavior. The "word evaluation value (W)" indicates an evaluation value regarding the possibility of the harmful behavior in a case where the word of the speaker corresponds to any keyword. For example, in a case where a word of the other person H2 is "You idiot!", the word evaluation value becomes "W=− 0.5". In a case where a word of the target person H1 himself or herself is "I want to die.", the word evaluation value becomes "W=−1.5". In case of a non-registered word, the word evaluation value becomes "W=0".

FIG. 9(C) illustrates a setting table regarding the vital evaluation, particularly, body temperature evaluation as one of the setting tables regarding the conditions. This table has, as columns, a body temperature deviation range and a body temperature evaluation value (V1). The "body temperature deviation range" item indicates a threshold range of a deviation between a body temperature of the target person H1 at that time and a set body temperature at normal times. The "body temperature evaluation value (V1)" indicates an evaluation value of a possibility of the harmful behavior in a case where a body temperature deviation by the body temperature of the target person H1 at that time corresponds to the "body temperature deviation range". For example, in a case where the body temperature deviation is within a range of zero or more and 0.2 or lower, the body temperature evaluation value becomes "V1=0". In a case where the body temperature deviation is within a range of 0.3 or more and 0.5 or lower, the body temperature evaluation value becomes "V1=−0.25". Thus, the body temperature evaluation value becomes a larger negative value as the deviation becomes larger.

Similarly, FIG. 9(D) illustrates a setting table of pulse rate evaluation, in particular. This table has, as columns, a pulse rate deviation range and a pulse rate evaluation value (V2). The "pulse rate deviation range" item indicates a threshold range regarding a deviation between a pulse rate of the target person H1 at that time and a set pulse rate at normal times. The "pulse rate evaluation value (V2)" indicates an evaluation value of a possibility of the harmful behavior in a case where a pulse rate deviation by the pulse rate of the target person H1 at that time corresponds to the "pulse rate deviation range".

FIG. 9(E) illustrates a setting table regarding the emotion evaluation as one of the setting tables regarding the conditions. This table has, as columns, a speaker emotion and an emotion evaluation value (E). The "speaker emotion" item indicates five kinds of values (normal, delight, anger, sorrow and pleasure) of classification of an emotion of a speaker (the target person H1 or the other person H2). The emotion evaluation value (E) indicates an evaluation value regarding a possibility of the harmful behavior in a case where the emotion of the speaker at that time corresponds to the value of the "speaker emotion", and becomes a coefficient of the calculation formula described above. For example, in a case where the emotion of the speaker is "normal", the emotion evaluation value becomes "E=1". In a case where the emotion of the speaker is "delight", the emotion evaluation value becomes "E=0.2". In a case where the emotion of the speaker is "anger", the emotion evaluation value becomes "E=1.3". In a case where the emotion of the speaker is "sorrow", the emotion evaluation value becomes "E=1.3". In a case where the emotion of the speaker is "pleasure", the emotion evaluation value becomes "E=0.2".

Determination of Degree of Risk and Handling

FIG. 9(F) further illustrates a setting table of a condition when handling is determined from a degree of risk. This table has, as columns, a range of the degree of risk, a level, and a handling type. The "range of the degree of risk" item indicates a threshold range of the degree of risk. The "level" item indicates a level associated with the "range of the degree of risk". The "handling type" item indicates a type of handling (in other words, handling behavior) associated with the "level". In the first embodiment, four levels and four handling types are mainly set. This table indicates "the higher the level of the degree of risk is, the higher risk or the possibility becomes. In the present embodiment, in a case where the degree of risk corresponds to a range of zero or more, the level corresponds to "level 1", and first handling is determined. In a case where the degree of risk corresponds to a range of −10 or more and less than zero, the level corresponds to "level 2", and second handling is determined. In a case where the degree of risk corresponds to a range of −20 or more and less than −10, the level corresponds to "level 3", and third handling is determined. In a case where the degree of risk corresponds to a range of less than −20, the level corresponds to "level 4", and fourth handling is determined.

The level 1 indicates normal and no problem. The first handling is only recording of information on a state, and immediate notification to the contractor terminal 3 or the like is not executed. Note that as a modification example, the first handling may be notification regarding a normal state to the contractor terminal 3. The level 2 indicates attention and observation required. The second handling is notification of attention to the contractor terminal 3, and is executed as immediate notification or a regular report. The level 3 indicates an alert. The third handling is notification of an immediate alert to the contractor terminal 3. The level 4 indicates serious risk. The fourth handling is immediate notification to the contractor terminal 3 and dispatch of the security guard H4.

User Setting

The harmful behavior detecting system according to the first embodiment can set determination conditions and the like related to detection of harmful behavior for each work environment or each of a pair of the target person H1 and the contractor H3. Basic determination conditions are set to the harmful behavior detecting system as illustrated in the example of FIG. 9. Moreover, as a modification example, the threshold value of the determination condition and the like can be changed in accordance with the user setting for each pair of the target person H1 and the contractor H3. This makes it possible to set determination conditions adjusted in accordance with intention or individual difference (stress tolerance or the like) of each user.

As an example, with respect to the determination conditions of FIG. 9(F), the threshold value of the range of the degree of risk may be changed. For example, in case of a user A1, a threshold value of a range of a degree of risk is adjusted up or down. For example, a boundary between level 2 and level 3 is changed into not only −10, but also −15 or −5. As another example, the handling can also be changed. For example, in case of a user A2, as the fourth handling for level 4, "dispatch of a security guard" is not carried out, but "notification of an alert" can be carried out. Alternatively, the fourth handling can be changed into "dispatch of a security guard after confirmation and permission of a contractor". Depending upon work environment, the fourth handling can be changed into "notification to the police".

Output of Handling Data

The harmful behavior detecting function of the harmful behavior detecting system according to the first embodiment includes a function to execute immediate detection, notification, and a handling operation with respect to harmful behavior. For example, the handling has the following configuration with respect to a case of notification like the second handling or the third handling.

In a case where a regular report is transmitted as the second handling, the handling has the following configuration. The server 2 describes a kind of information, which is set to each pair of the target person H1 and the contractor H3 in advance, in a report. For example, information on an ID of the target person H1, date and time, a location, a degree of risk, and a predetermined message is contained in the report. The server 2 sums up a state or a result on the basis of the state DB 52, for example, by a unit of a predetermined period of time such as one day or one week, and describes it in the report. The server 2 transmits the report to the contractor terminal 3 at regular timing. The information thus summed up may contain the number of times, frequency, or an average value of the harmful behavior, and may contain a graph thereof. In a case where report data are constituted by Web pages and held in the server 2, it may be a system in which the report data on the server 2 may be browsed from the contractor terminal 3 or the like.

In a case where an immediate alert is notified as the third handling, the handling has the following configuration. the server 2 immediately transmits notification information for an alert to the contractor terminal 3. The information content of a type set for each pair of the target person H1 and the contractor H3 by the user in advance is described in this notification information. For example, information on an ID of the target person H1, date and time, a location, a degree of risk, and a predetermined alert message (for example, "a possibility that the user A suffers power harassment is presumed to be high.") is contained in this notification information.

In a case where a security guard is to be dispatched as the fourth handling, the handling has the following configuration. Information on a contact address and the like of persons such as the security guard H4 who is a target of dispatch is set to the server 2 in advance. The server 2 notifies the contractor terminal 3 of it, and executes communication of an instruction of dispatch to the contact address of the security guard H4 by using a telephone, a mail, or the like. Information on a place or an area at which the target person H1 and the like are positioned is contained in this instruction. The security guard H4 goes to a spot at which the target person H1 and the like are positioned in accordance with the instruction, and conducts arbitration or the like. As another example of the handling, it is possible to immediately notify the police of it.

In a case where the assailant can be estimated, the server 2 may describe not only victim information, but also assailant information in the handling data D2 depending upon the setting.

Analysis Example

An example of analysis using the data of FIG. 8 and the conditions of FIG. 9 is as follows. Note that the data example of FIG. 8 corresponds to the first pattern of FIG. 7(A). In the table of FIG. 8, the user B who is the other person H2 produces a speech of "You idiot!" at a point of time of a first row, for example, and an emotion at that time is normal. On the other hand, a body temperature deviation of the user A who is the target person H1 is zero, and a pulse rate deviation thereof is one. From a state of each of the data at this time, a word evaluation value (W) becomes −0.5 on the basis of the conditions of FIG. 9; an emotion evaluation value (E) becomes one, and vital evaluation values (V) become "V1=0" and "V2=0". An index value (S) becomes "S=(W+V1+V2)×E=(−0.5+0+0)×1=−0.5" from the formula. Similarly, at a point of time of a second row, a user C who is the other person H2 produces a speech of "You idiot!", for example, and an emotion at that time is anger. On the other hand, the body temperature deviation of the target person H1 is one, and the pulse rate deviation thereof is 10. At this time, the respective values become "W=−0.5", "E=1.3", "V1=−0.5", and "V2=−0.5". The index value (S) becomes "S=(−0.5−0.5−0.5)×1.3=−1.95".

At a point of time of a third row, the location is another location, the other unknown person produces a speech of "Bite me!", for example, and an emotion at that time is anger. On the other hand, the body temperature deviation of the target person H1 is zero, and the pulse rate deviation thereof is 12. At this time, the respective values become "W=−0.3", "E=1.3", "V1=0", and "V2=−0.75". The index value (S) becomes "S=(−0.3+0−0.75)×1.3=−1.365". At a point of time of a fourth row, the user B who is the other person H2 produces a speech of "You bastard!", for example, and an emotion at that time is delight. On the other hand, the body temperature deviation of the target person H1 is zero, and the pulse rate deviation thereof is zero. At this time, the respective values become "W=−0.5", "E=0.2", "V1=0", and "V2=0". The index value (S) becomes "S=(−0.5+0+0)×0.2=−0.1". At a point of time of a fifth row, a user D who is the other person H2 produces a speech of a word that is not registered in the keyword DB, and an emotion at that time is anger. On the other hand, the body temperature deviation of the target person H1 is 0.5, and the pulse rate deviation thereof is 5. At this time, the respective values become "W=0", "E=1.3", "V1=−0.25", and "V2=−0.25". The index value (S) becomes "S=(0−0.25−0.25)×1.3=−0.65".

Then, at a point of time of a 24th row, the user A who is the target person H1 produces a speech of a word "Distressing.", and an emotion at that time is sorrow. The body temperature deviation at that time is one, and the pulse rate deviation thereof is 5. At this time, the respective values become "W=−0.5", "E=1.3", "V1=−0.5", and "V2=−0.25". The index value (S) becomes "S=(−0.5−0.5−0.25)×1.3=−1.625". At a point of time of a 25th row, the target person H1 produces a speech of a non-registered word, and an emotion at that time is sorrow. The body temperature deviation at that time is one, and the pulse rate deviation thereof is 10. At this time, the respective values become "W=0", "E=1.3", "V1=−0.5", and "V2=−0.5". The index value (S) becomes "S=(0−0.5−0.5)×1.3=−1.3". At a point of time of a 26th row, the target person H1 produces a speech of a word "I want to die.", and an emotion at that time is sorrow. The body temperature deviation at that time is one, and the pulse rate deviation thereof is 13. At this time, the respective values become "W=−1.5", "E=1.3", "V1=−0.5", and "V2=−0.75". The index value (S) becomes "S=(−1.5−0.5−0.75)×1.3=−3.575".

The server 2 calculates a degree of risk at each point of time. For example, at the points of time up to the 26th row, the degree of risk becomes "(−0.5−1.95 . . . −3.575)=−11.065" as a total of the index values from the first row to the 26th row. Since the degree of risk corresponds to the degree of risk in the range of level 3 on the basis of the determination conditions of FIG. 9, the server 2 determines that it is the third handling.

Additional Function—Recording or Erasing of Voice Data

The harmful behavior detecting system according to the first embodiment has the following additional functions as the other functions. In the additional function, the information terminal 1 or the server 2 may record and remain, for evidence, each of the data such as obtained voice data in accordance with user settings, or may erase them automatically.

In a case where a user considers usage of the voice data later, it is possible to set the recording described above. In case of this setting, for example, by the configuration illustrated in FIG. 1 or FIG. 6 described above, the information terminal 1 records and holds the voice data in a memory or the like provided therein. Alternatively, the server 2 records and holds the voice data in the DB 50. These recorded voice data are managed, as a history, in a state where the voice data are associated with the ID, the date and time, the location, the voice information, the index value, and the handling data D2 for each target person H1. In a case where the user wants to refer to the voice data for confirmation later, the user carries out a predetermined input operation (for example, designation of a condition for the date and time and the like). In response to this, the corresponding voice data and the related information thereof are read out from the information terminal 1 or the server 2, whereby reproduction or display thereof can be executed.

The contractor H3 or the like confirms the voice data and the information, whereby it is possible to confirm the behavior such as power harassment. In a case where the voice data and the like are held in the DB 50 of the server 2 side, it is possible to securely hold the data of the user at the business entity side corresponding to a third party, and they can be utilized for confirmation or the like later.

In case of setting of the erasing described above, the information terminal 1 or the server 2 erases the voice data after necessary processing. In this case, it is possible to reduce memory utilization of the information terminal 1 or the server 2. In a case where the user becomes concerned about privacy including his or her voice, the user can set erasing of the voice data in this manner.

Additional Function—Limitation of Time and Place

In the first embodiment, the harmful behavior detecting system is configured so as to always and basically execute basic processing related to the harmful behavior detecting function such as acquisition of the voice data or creation of the transmitted data on the basis of the user setting. The information terminal 1 can always input voice and obtain voice data in accordance with the user setting, or can also obtain voice data at only a limited time. As the latter setting, a configuration example as follows can be cited, for example. As a first configuration example, by the user setting, date and time (including a time zone), a place and the like, which become a target to obtain voice, are set in advance for each pair of the target person H1 and the contractor H3. For example, the place is restricted to an area around the location of the company to which the target person H1 belongs, and the date and time are restricted to the date and time for working of the company. For example, the information terminal 1 confirms whether a state of current date and time and a current place corresponds to the set condition for the date and time and the place or not by using existing sensors and the like. Only in a case where the state corresponds to the set condition, the information terminal 1 automatically switches the harmful behavior detecting function into an on state, and executes the processing such as the acquisition of the voice data described above. In a case where the condition is not satisfied, the information terminal 1 automatically switches the harmful behavior detecting function into an off state. In case of this setting, it is possible to reduce a throughput of the information terminal 1 and a usage amount of the battery.

As a second configuration example, on the assumption that the voice input function is set to an on state, the information terminal 1 determines whether volume of the voice inputted from the microphone becomes a predetermined volume threshold value or larger or not, and whether a volume state thereof continues for a predetermined time or longer or not. In a case where the voice satisfies the conditions, the information terminal 1 sets the harmful behavior detecting function to the on state, and executes the processing described above. In a case where the voice does not satisfy the conditions, the information terminal 1 automatically switches the harmful behavior detecting function to the off state. In case of this setting, similarly, it is possible to reduce a throughput of the information terminal 1 and a usage amount of the battery. In case of this setting, for example, in a case where the other person H2 produces a speech such as abuse loudly, it becomes a trigger to execute the processing.

Effects and the Like

As described above, according to the harmful behavior detecting system according to the first embodiment, for example, it is possible to estimate and detect a possibility regarding harmful behavior such as power harassment in the company, and it is possible to support handling thereof. According to the harmful behavior detecting system according to the first embodiment, it is possible to detect and care a victim and an assailant, and it is possible to prevent and early detect the harmful behavior. This makes it possible to contribute improvement of the work environment and prevention of deterioration thereof. According to the harmful behavior detecting system according to the first embodiment, the individual target person H1 can protect himself or herself from the harmful behavior. According to the harmful behavior detecting system according to the first embodiment, even in a case where an assailant or a victim is unconscious of the harmful behavior, it is possible to indicate a possibility of power harassment or the like, and this makes it possible to prevent the harmful behavior and improve their awareness. According to this system, it is possible to detect and handle harmful behavior in real time, and this makes it possible to prevent the harmful behavior before an incident or the like occurs. According to this system, it is possible to evaluate the harmful behavior from the viewpoint of a third party, and handling thereof can be taken.

The following can be realized as the other embodiment. In the first embodiment, the server 2 of the business entity exists on the communication network 5, is connected to plural kinds of work environment for communication, and provides the service to a plurality of target persons H1. The present invention is not limited to this. The server 2 may be a server provided in specific work environment via a LAN or the like. Namely, in certain work environment, the functions described above may be realized as a client-server system. Further, the case where the computer constituting the harmful behavior detecting system is mainly configured by the information terminal 1 and the server 2 has been described. However, the present invention is not limited to this. the other cooperating apparatus (for example, a server on a LAN) may further be provided therein. Further, the server 2 of the business entity may accumulate the data from the information terminal 1 of each of the plurality of target persons H1, for example, and execute analytical processing such as statistical processing. Thus, the set information of the DB 50, for example, the determination conditions may be updated. The analysis may include analysis of an attribute such as age, sexuality, or a job type, for example. Further, for example, in a case where a security camera system or the like is installed in work environment such as a store, the harmful behavior detecting system may obtain video data of a security camera, and execute the analysis in combination with the data described above.

As a modification example, the contractor H3 in FIG. 1 may be the same as the target person H1. In this case, when the handling data D2 such as notification are outputted from the server 2, the handling data D2 are transmitted to the information terminal 1 of the target person H1.

As another modification example, a parameter such as a volume of voice may be utilized together when the analytical processing based on the voice is executed. For example, in a case where a volume of the word of the other person H2 is a threshold value or larger, or in a case where a volume difference between the words is larger, the system may make an evaluation value larger by that difference.

Modification Example—A Plurality of Target Person

Figure 10:
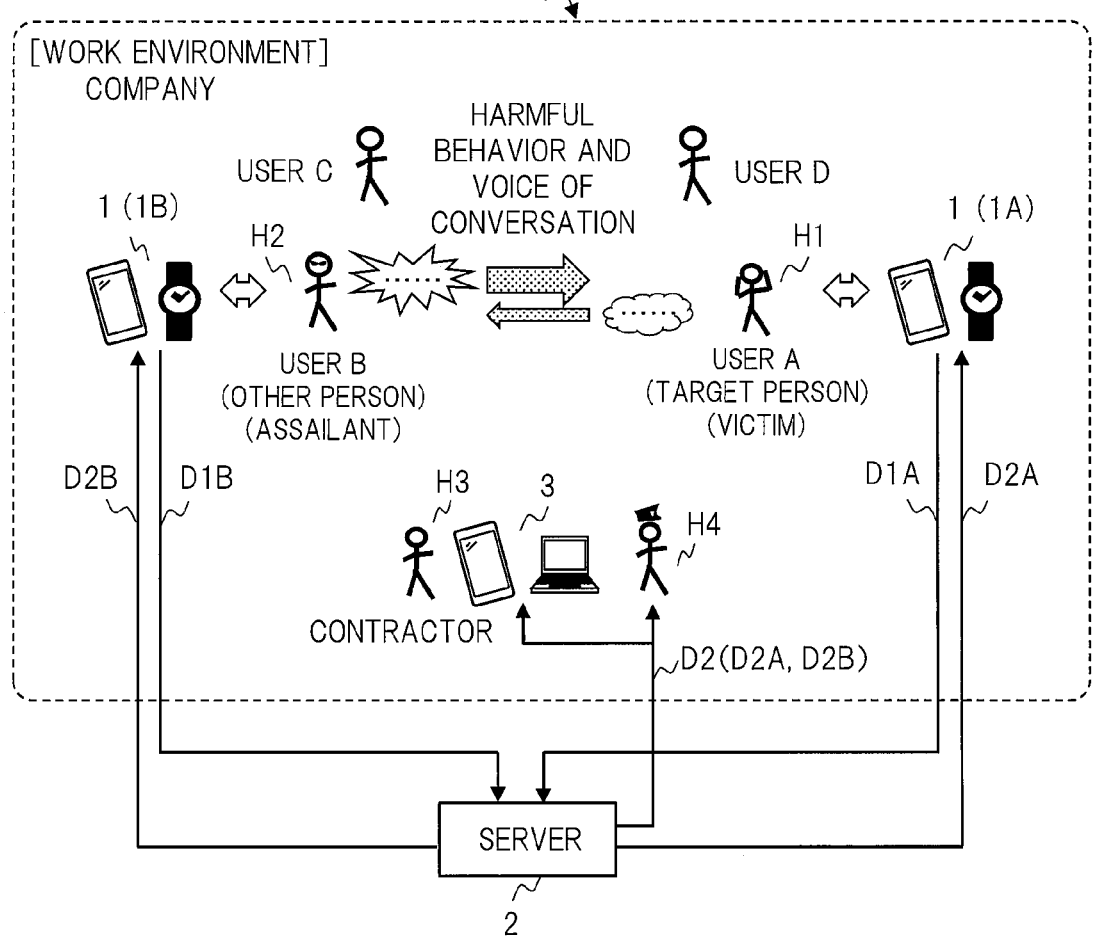
FIG. 10 is a view illustrating a configuration of a harmful behavior detecting system according to a modification example of the first embodiment.

FIG. 10 illustrates a usage form in which a plurality of target persons H1 exists in certain work environment in the harmful behavior detecting system according to a modification example of the first embodiment. For example, each of all company members of a certain post in a company becomes a target person H1. A contractor H3 is a specific person having a relationship with the plurality of company members such as a manager or a staff in the general affairs department, for example. The contractor H3 utilizes this service so that behavior of each of the company members such as power harassment can be prevented and detected. In case of this usage form, each of the company members possesses an information terminal 1 in the similar manner. In case of this usage form, at a point of time of introduction, a suitable deterrent effect regarding harmful behavior can be obtained. Moreover, in this usage form, even in a case where a given company member carries out power harassment unconsciously or suffers the power harassment, it is possible to detect and indicate a possibility of the harmful behavior. Further, in this form, both the transmitted data D1 from the information terminal 1 of a victim side and the transmitted data D1 from the information terminal 1 of an assailant side can be obtained. Therefore, it is possible to execute estimate and determination of the harmful behavior while taking into consideration the both the victim and the assailant.

In the example illustrated in FIG. 10, as the plurality of target persons H1, there are users A, B, C, and D who are the company members. Each of the target persons H1 possesses the information terminal 1. For example, the user A possesses an information terminal 1A, and the user B possesses an information terminal 1B. A configuration of each of the information terminals 1 and a configuration of the server 2 are similar to the case of FIG. 6, for example. In the present embodiment, with respect to harmful behavior at a certain point of time, the user A is a victim, and the user B is an assailant.

In a situation of occurrence of the harmful behavior, the information terminal 1A of the user A constructs transmitted data D1A on the basis of a voice input therefrom, and transmits the transmitted data D1A to the server 2. The information terminal 1B of the user B constructs transmitted data D1B on the basis of a voice input therefrom, and transmits the transmitted data D1B to the server 2. The server 2 receives the transmitted data D1A and the transmitted data D1B, determines a degree of risk of each of the target persons H1 (that is, the users A and B), determines handling for each of the target persons H1, and creates handling data D2 (containing handling data D2A and handling data D2B) for each of the target persons H1. For example, the server 2 transmits the handling data D2 (containing D2A and D2B) to the contractor terminal 3 or the like.

Further, in this configuration example, the server 2 may transmit the handling data D2A to the information terminal 1A, and may transmit the handling data D2B to the information terminal 1B. The handling data D2 to be transmitted to each of the information terminals 1 may contains the content based on a state of the user, or may contain the content different from each other between the handling data D2A and D2B. For example, a message for giving out a possibility of a victim in the harmful behavior is notified to the user A, and a message for giving out a possibility of an assailant in the harmful behavior is notified to the user B. According to this modification example, it is possible to detect and care both the victim and the assailant in the plurality of persons of the work environment.

Second Embodiment

A harmful behavior detecting system according to a second embodiment of the present invention will be described with reference to FIG. 11. Hereinafter, different constituent portions of the second embodiment from the first embodiment will be described. In the first embodiment, the harmful behavior detecting system is configured so that the information terminal 1 and the server 2 cooperate with each other to share the processes. Various kinds of configurations are possible for this sharing. In the second embodiment, the harmful behavior detecting system is configured so that a server 2 executes main processes related to a harmful behavior detecting function.

Figure 11:
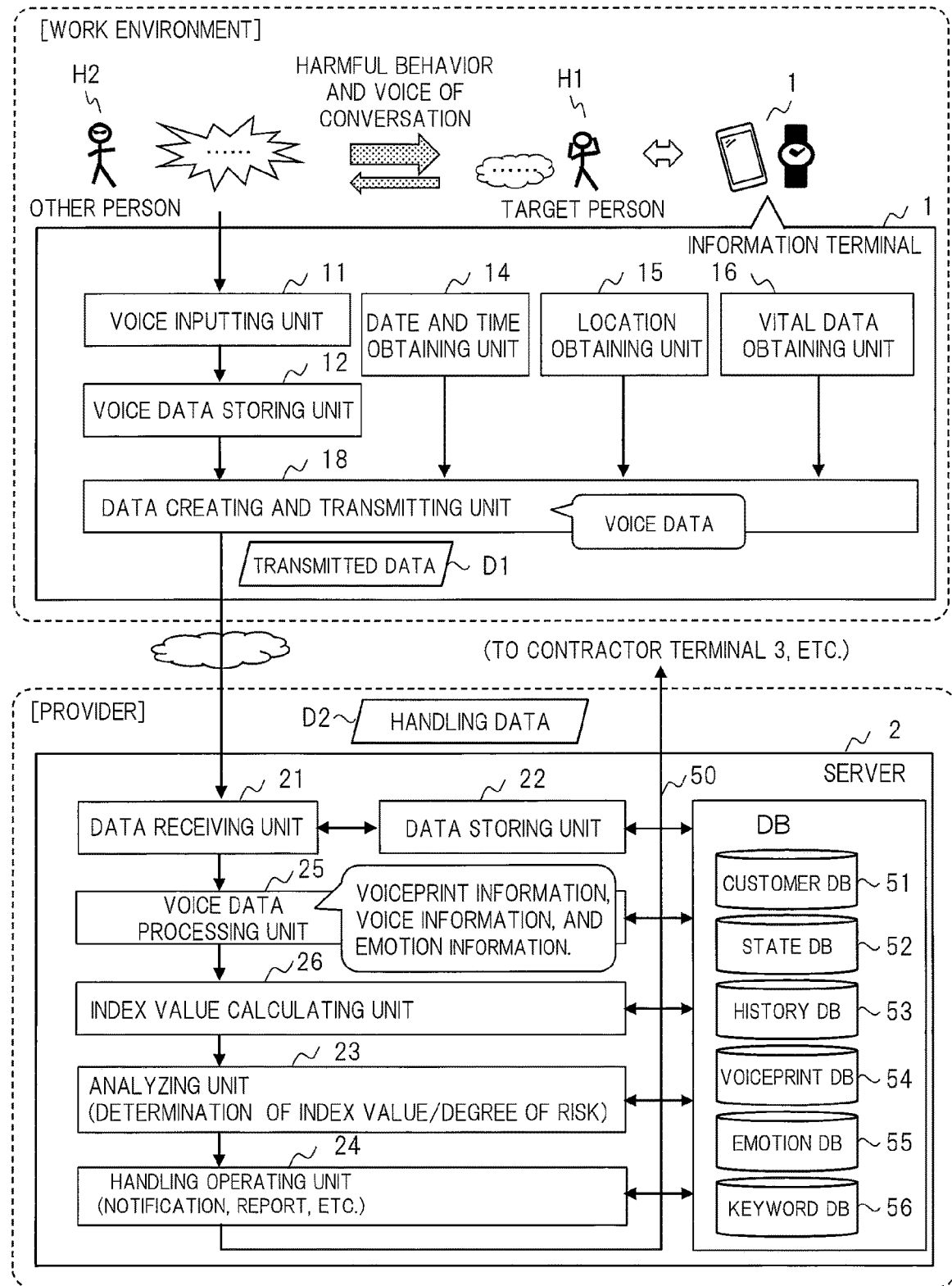
FIG. 11 is a view illustrating a configuration of a harmful behavior detecting system according to a second embodiment of the present invention.

FIG. 11 illustrates a configuration of the harmful behavior detecting system according to the second embodiment. An information terminal 1 is different from the configuration of FIG. 6 described above in that the information terminal 1 does not include the voice data processing unit 13 and the index value calculating unit 17. A data creating and transmitting unit 18 of the information terminal 1 obtains voice data, date and time, location, vital data, and the like; constructs the transmitted data D1 containing these data; subjects the transmitted data D1 to encryption; and transmits them to the server 2. In the second embodiment, the transmitted data D1 containing the voice data are transferred on a communication network 5.

Compared with the configuration of FIG. 6 described above, a voice data processing unit 25 and an index value calculating unit 26 are added to the server 2. The voice data processing unit 25 obtains voiceprint information, voice information, and emotion information on the basis of the voice data contained in the transmitted data D1 by means of the similar processing described above. In the similar manner to the above, the index value calculating unit 26 calculates an index value on the basis of analysis of a combination of a plurality of elements. The analyzing unit 23 uses the index value calculated by the index value calculating unit 26 to determine a degree of risk. A DB 50 includes a customer DB 51, a state DB 52, a history DB 53, a voiceprint DB 54, an emotion DB 55, a keyword DB 56, and the like. Information related to a plurality of users is stored in the DB 50 of the server 2 side.

As described above, according to the harmful behavior detecting system of the second embodiment, it is also possible to obtain the similar effects to those in the first embodiment.

Third Embodiment

A harmful behavior detecting system according to a third embodiment of the present invention will be described with reference to FIG. 12. The third embodiment illustrates a configuration in which an information terminal 1 executes main processes related to the harmful behavior detecting function.

Figure 12:
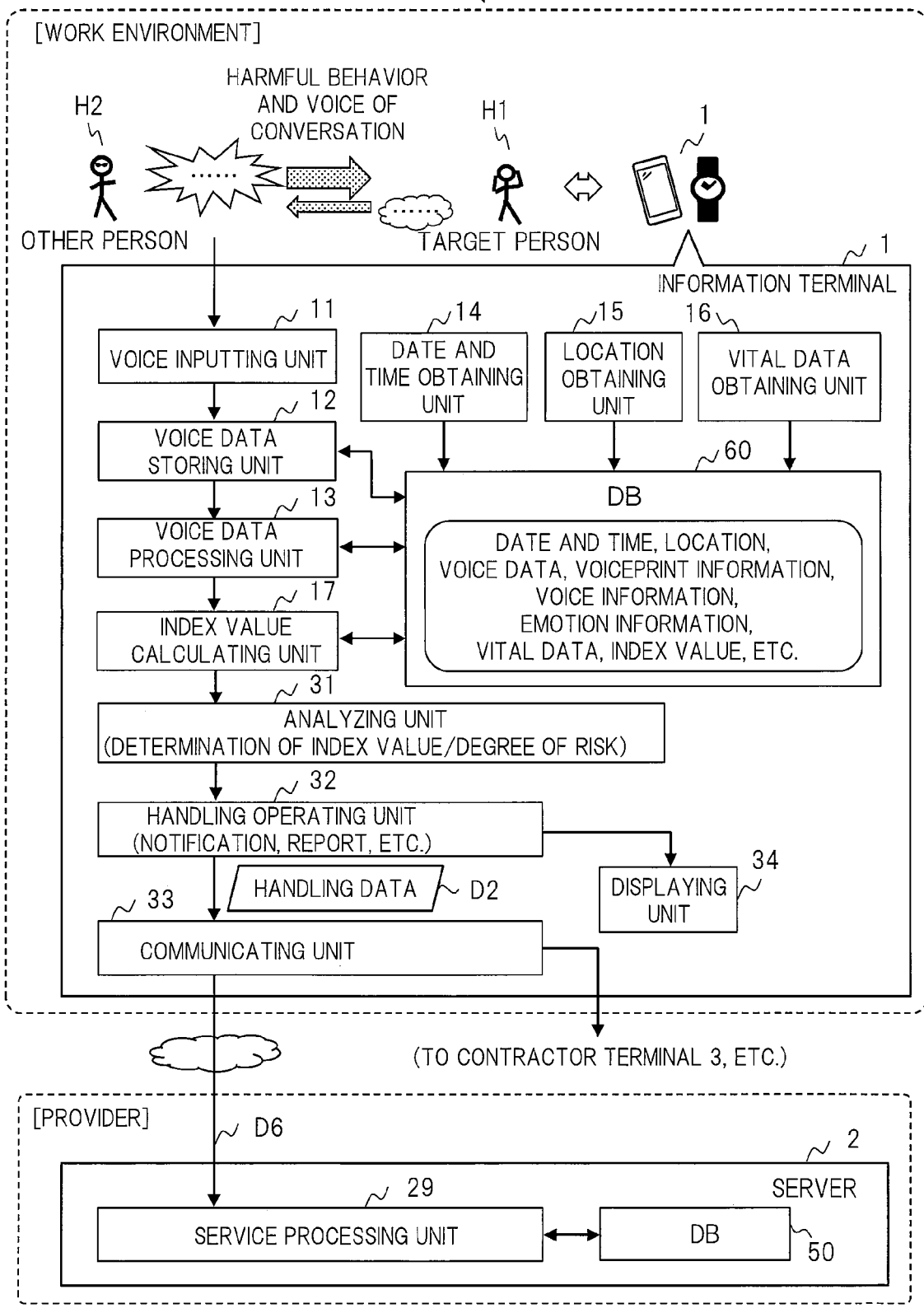
FIG. 12 is a view illustrating a configuration of a harmful behavior detecting system according to a third embodiment of the present invention.

FIG. 12 illustrates a configuration of the harmful behavior detecting system according to the third embodiment. Compared with the configuration of FIG. 6 described above, the information terminal 1 includes an analyzing unit 31, a handling operating unit 32, a communicating unit 33, a display unit 34, and a DB 60. The analyzing unit 31 uses an index value calculated by an index value calculating unit 17 to determine a degree of risk. The handling operating unit 32 determines handling in accordance with the degree of risk; creates handling data D2; and controls operations such as notification or a report. The communicating unit 33 executes communication with a server 2, communication with the contractor terminal 3, communication to the security guard H4 on the basis of the control from the handling operating unit 32. Further, the display unit 34 causes a display to display information of the handling data D2 such as notification or a report.

The DB 60 corresponds to a DB 50 of the server 2 side. Various kinds of data such as date and time, a location, voice data, voiceprint information, voice information, emotion information, vital data, an index value, or a degree of risk are held in the DB 60 so as to be associated with each other. Information related to a certain user (a target person H1) is stored in the DB 60 of the information terminal 1 side. In the configuration according to the third embodiment, there are not the transmitted data D1 described above. Alternatively, there are notification information D6 to the server 2 and the like. The notification information D6 is information for notifying a state of service usage in the information terminal 1 and the like. Note that information on the index value or the degree of risk may be contained in the notification information D6, and handling information representing that a handling operation is carried out may be contained therein.

Compared with the configuration illustrated in FIG. 6 described above, the server 2 does not include an analyzing unit 23 and a handling operating unit 24, but includes a service processing unit 29. The service processing unit 29 receives access from each of a plurality of information terminals 1; executes processes such as service usage contract or user setting; and stores set information and the like in the DB 50. Further, the service processing unit 29 obtains the notification information D6 from each of the information terminals 1, and stores information such as a service usage state or a history in the DB 50.

As described above, according to the harmful behavior detecting system of the third embodiment, it is also possible to obtain similar effects to those of the first embodiment or the second embodiment.

LIST OF REFERENCE SIGNS

1 . . . information terminal, 2 . . . server, 3 . . . contractor terminal, 5 . . . communication network, H1 . . . target person, H2 . . . the other person, H3 . . . contractor, H4 . . . security guard, D1 . . . transmitted data, D2 . . . handling data.

It is claimed:

1. A harmful behavior detecting system, comprising:
a computer configured to execute observation and detection regarding harmful behavior among people in work environment, the harmful behavior including power harassment, sexual harassment, and bullying,
wherein the computer is configured to:
obtain data containing voice information, emotion information, or vital data of a target person, date and time information, and location information of the target person, the data being obtained by inputting voice around a target person, the voice information containing words that represent conversation content extracted on a basis of automatic voice recognition from the voice data, the emotion information representing emotion classified on a basis of emotion recognition from the voice data;
calculate an index value regarding the harmful behavior by using five elements on a basis of the obtained data, the five elements including words and an emotion of another person positioned around the target person, and words, emotion, and vital data of the target person;
estimate a state of the harmful behavior on a basis of the index value, the state of the harmful behavior including a victim or an assailant of the harmful behavior, and presence or absence of the harmful behavior or a degree thereof; and
output handling data for handling the harmful behavior in accordance with the estimated state;

wherein the target person is a first user who uses the harmful behavior detecting system and who may be a victim or an assailant of the harmful behavior while the another person may be the assailant or the victim of the harmful behavior;

wherein the voice is received by an apparatus carried by the user or an apparatus installed in the work environment;

wherein the vital data is detected by a sensor of the apparatus carried by the user, and includes a body temperature or a pulse rate;

in the step of obtaining the data, the computer compares an obtained word and a set key word, calculate an evaluation value (W) of the word as a numerical value in accordance with the corresponding key word, compares a value of the obtained vital data with a setting range, calculate an evaluation value (V) of the vital data as a numerical value in accordance with the corresponding range, and calculate an evaluation value (E) of the emotion as a numerical value in accordance with the obtained value of the emotion, wherein the computer calculates the index value by a calculation reflecting the evaluation value (E) of the emotion of the target person or the another person, the evaluation value (W) of the word of the target person or the other person, and the evaluation value (V) of the vital data of the target person, when the index value is calculated at each time point in time series, the computer is configured to:
calculate the index value by using a calculation formula of "([the evaluation value (W) of the word of the other person]+[the evaluation value (V) of the vital data of the target person])×[the evaluation value (E) of the emotion of the other person]", or
calculate the index value by using a calculation formula of "([the evaluation value (W) of the word of the target person]+[the evaluation value (V) of the vital data of the target person])×[the evaluation value (E) of the emotion of the target person]".

2. The harmful behavior detecting system according to claim 1,
wherein the computer is configured to: calculate the index value at each time point in a time series; calculate a degree of risk regarding a state of the target person by totaling the index value at each time point; and determine the handling in accordance with the degree of risk.

3. The harmful behavior detecting system according to claim 1,
wherein the computer is configured to: use a voiceprint based on voiceprint recognition from the voice data to execute distinction or individual identification of whether a speaker of the voice is the target person or the other person other than the target person; obtain voiceprint information containing a result of the distinction or the individual identification; and execute the estimate by using the voiceprint information.

4. The harmful behavior detecting system according to claim 1, wherein
the computer is configured to: compare the index value with a plurality of set threshold ranges; determine a corresponding handling from a plurality of set handlings in accordance with a corresponding threshold range; create the handling data based on the determined handling; and transmit the handling data to a set contractor terminal or a set contact address, and the plurality of handlings includes notification of attention, notification of alert, a regular report, and dispatch of a security guard.

5. The harmful behavior detecting system according to claim 1,
wherein the computer is configured to: save the voice data together with related information in a database; and then read out the voice data and the related information from the database and output the voice data and the related information in a case where an instruction is received.

6. The harmful behavior detecting system according to claim 1,
wherein the computer is configured to start to obtain the data containing the voice data in a case where states of current date and time or current location of the target person correspond to date and time or place set for every target person or in a case where a volume of the voice around the target person is equal to or more than a predetermined volume threshold value.

7. The harmful behavior detecting system according to claim 1,
wherein the computer is configured to:
compare the obtained word with a set keyword,
calculate the evaluation value (W) of the word in accordance with the corresponding keyword,
calculate the evaluation value (E) of the emotion in accordance with the obtained value of the emotion,
compare the obtained value of the vital data with a set range, and
calculate the evaluation value (V) of the vital data in accordance with the corresponding range;
wherein the computer is further configured to:
if the voice of the target person is absent, calculate the index value on the basis of combination of three elements including the evaluation value (W) of the word and the evaluation value (E) of the emotion of the other person and the evaluation value (V) of the vital data of the target person; and,
if the voice of the target person is present, calculate the index value on the basis of combination of three elements including the evaluation value (W) of the word, the evaluation value (E) of the emotion and the evaluation value (V) of the vital data of the target person,
at each time point in a time series,
if the voice of the target person is absent, calculate the index value by using a calculation formula of "([the evaluation value (W) of the word of the other person]+[the evaluation value (V) of the vital data of the target person])×[the evaluation value (E) of the emotion of the other person]"; and,
if the voice of the target person is present, calculate the index value by using a calculation formula of "([the evaluation value (W) of the word of the target person]+[the evaluation value (V) of the vital data of the target person])×[the evaluation value (E) of the emotion of the target person]".

8. The harmful behavior detecting system according to claim 1,
wherein a threshold value of a determination condition regarding the estimated state of the harmful behavior is set to adjust according to individual differences for every target person in accordance with user settings.

9. A harmful behavior detecting method by a harmful behavior detecting system comprising a computer configured to execute observation and detection regarding harmful behavior among people in work environment, the harmful behavior including power harassment, sexual harassment, and bullying, the harmful behavior detecting method executed by the computer comprising:
obtaining data containing voice information, emotion information, or vital data of a target person, date and time information, and location information of the target person, the data being obtained by inputting voice around a target person, the voice information containing words that represent conversation content extracted on a basis of automatic voice recognition from the voice data, the emotion information representing emotion classified on a basis of emotion recognition from the voice data;
calculating an index value regarding the harmful behavior by using five elements on a basis of the obtained data, the five elements including words and an emotion of another person positioned around the target person, and words, emotion, and vital data of the target person;
estimating a state of the harmful behavior on a basis of the index value, the state of the harmful behavior including a victim or an assailant of the harmful behavior, and presence or absence of the harmful behavior or a degree thereof; and
outputting handling data for handling the harmful behavior in accordance with the estimated state;
wherein the target person is a first user who uses the harmful behavior detecting system and who may be a victim or an assailant of the harmful behavior while the another person may be the assailant or the victim of the harmful behavior;
wherein the voice is received by an apparatus carried by the user or an apparatus installed in the work environment;
wherein the vital data is detected by a sensor of the apparatus carried by the user, and includes a body temperature or a pulse rate;
in the step of obtaining the data, the computer comparing an obtained word and a set key word, calculate an evaluation value (W) of the word as a numerical value in accordance with the corresponding key word, comparing a value of the obtained vital data with a setting range, calculating an evaluation value (V) of the vital data as a numerical value in accordance with the corresponding range, and calculating an evaluation value (E) of the emotion as a numerical value in accordance with the obtained value of the emotion,
the computer calculating the index value by a calculation reflecting the evaluation value (E) of the emotion of the target person or the another person, the evaluation value (W) of the word of the target person or the other person, and the evaluation value (V) of the vital data of the target person,
when the index value is calculated at each time point in time series, the computer:
calculating the index value by using a calculation formula of "([the evaluation value (W) of the word of the other person]+[the evaluation value (V) of the vital data of the target person])×[the evaluation value (E) of the emotion of the other person]", or
calculating the index value by using a calculation formula of "([the evaluation value (W) of the word of the target person]+[the evaluation value (V) of the vital data of the target person])×[the evaluation value (E) of the emotion of the target person]".

* * * * *